United States Patent
Rasmussen

(10) Patent No.: US 6,887,503 B1
(45) Date of Patent: May 3, 2005

(54) FOOD PRODUCT WHICH ARTIFICIALLY HAS BEEN GIVEN A CELL-LIKE STRUCTURE BY COEXTRUSION OF SEVERAL COMPONENTS, AND METHOD AND APPARATUS FOR MANUFACTURING SUCH FOOD PRODUCT

(76) Inventor: Ole-Bendt Rasmussen, Sagenstrasse 12, CH-6318 Walchwil/Zug (CH)

(*) Notice: Subject to any disclaimer, the term of this patent is extended or adjusted under 35 U.S.C. 154(b) by 0 days.

(21) Appl. No.: 09/926,310

(22) PCT Filed: Apr. 13, 2000

(86) PCT No.: PCT/EP00/03713

§ 371 (c)(1),
(2), (4) Date: Oct. 11, 2001

(87) PCT Pub. No.: WO00/60959

PCT Pub. Date: Oct. 19, 2000

(30) Foreign Application Priority Data

Apr. 13, 1999 (GB) .............................................. 9908444
May 28, 1999 (GB) .............................................. 9912565

(51) Int. Cl.[7] ............................. A23P 1/12; A23G 3/00; A23G 3/20; A23J 3/26
(52) U.S. Cl. ........................ 426/94; 426/283; 426/284; 426/448; 426/453; 426/101; 426/502; 426/516; 426/517; 426/660
(58) Field of Search ........................ 426/94, 101, 283, 426/284, 448, 453, 516, 517, 660

(56) References Cited

U.S. PATENT DOCUMENTS

| | | | | |
|---|---|---|---|---|
| 4,748,031 A | * | 5/1988 | Koppa | 426/283 |
| 4,853,236 A | * | 8/1989 | Langler | 426/102 |
| 4,888,192 A | * | 12/1989 | Ramnarine | 426/448 |
| 5,466,476 A | * | 11/1995 | Finkel et al. | 426/556 |
| 5,558,890 A | * | 9/1996 | Brown et al. | 426/94 |

* cited by examiner

*Primary Examiner*—N. Bhat
(74) *Attorney, Agent, or Firm*—Lerner, David, Littenberg, Krumholz & Mentlik, LLP

(57) ABSTRACT

Two or more different materials such as food material are co-extruded through adjacent orifices of an extruder. The flows of the two materials are cut in a direction transverse to the flow to form segments of flow. These segments are interspersed so as to join upstream and downstream of each segment of first material to a segment of a second material. Generally two rows of joined segmented flows are extruded side by side. Preferably between the tow rows is formed a boundary cell wall which usually is transformed to a harder material after extrusion. Cell walls of the harder material may surround, in two or three dimensions, cells of softer of foamed material. The apparatus and method to provide the food product having the cell like structure is particularly useful for producing confectionery products formed of chocolate, marzipan or dough materials.

70 Claims, 16 Drawing Sheets

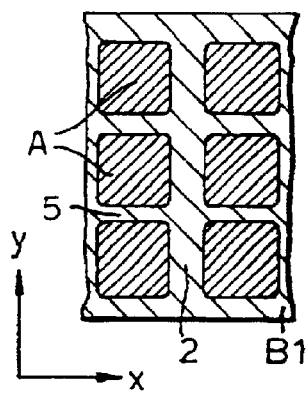
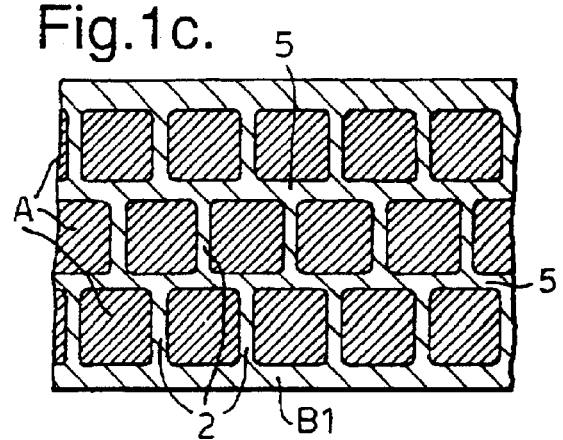
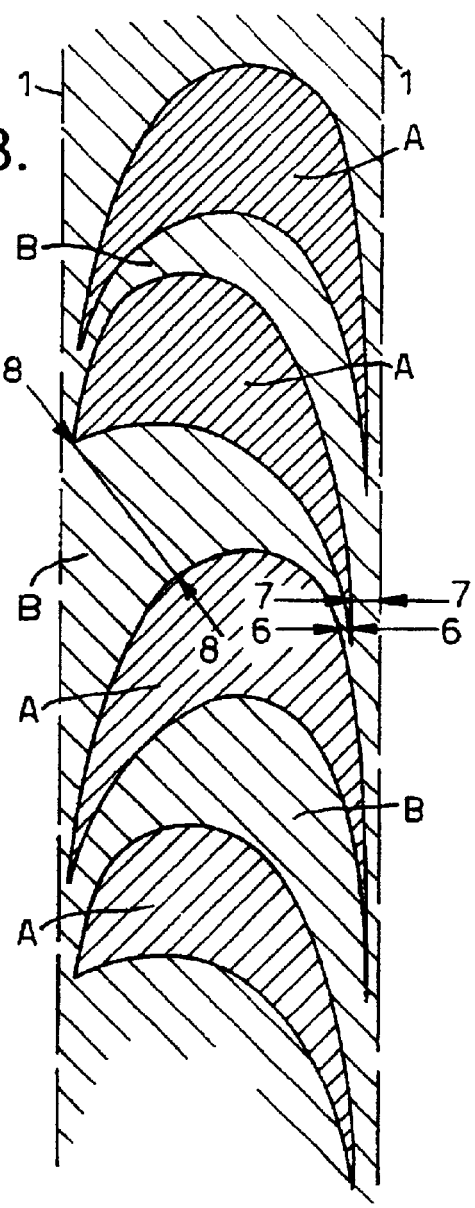

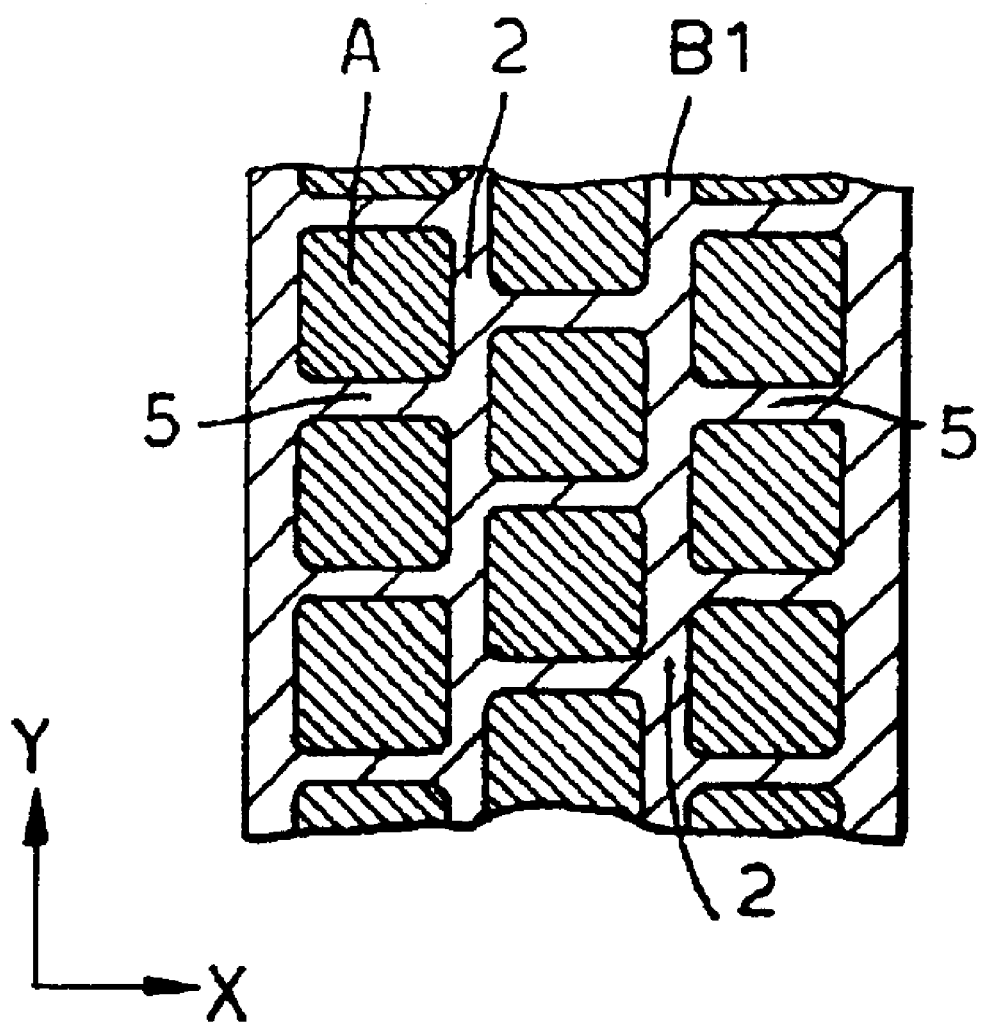

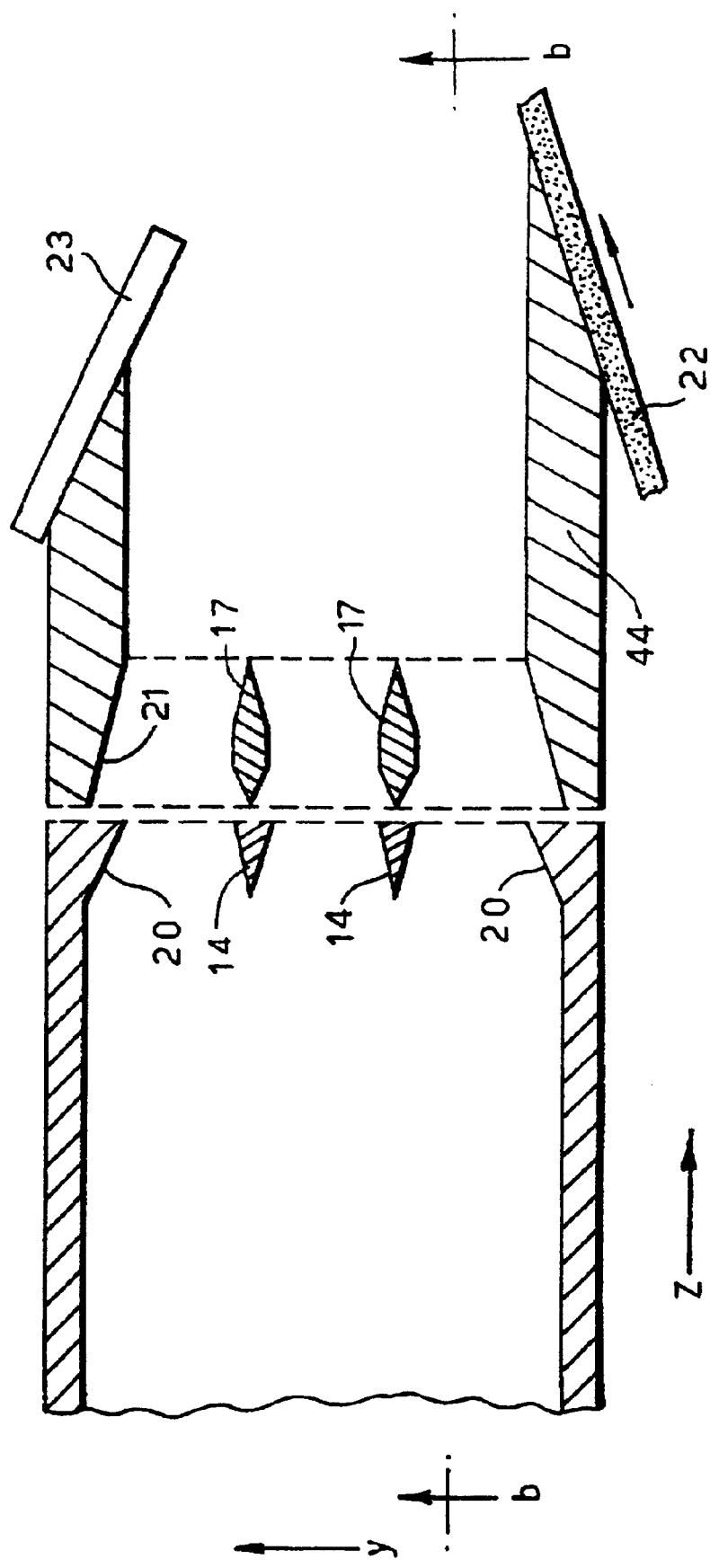

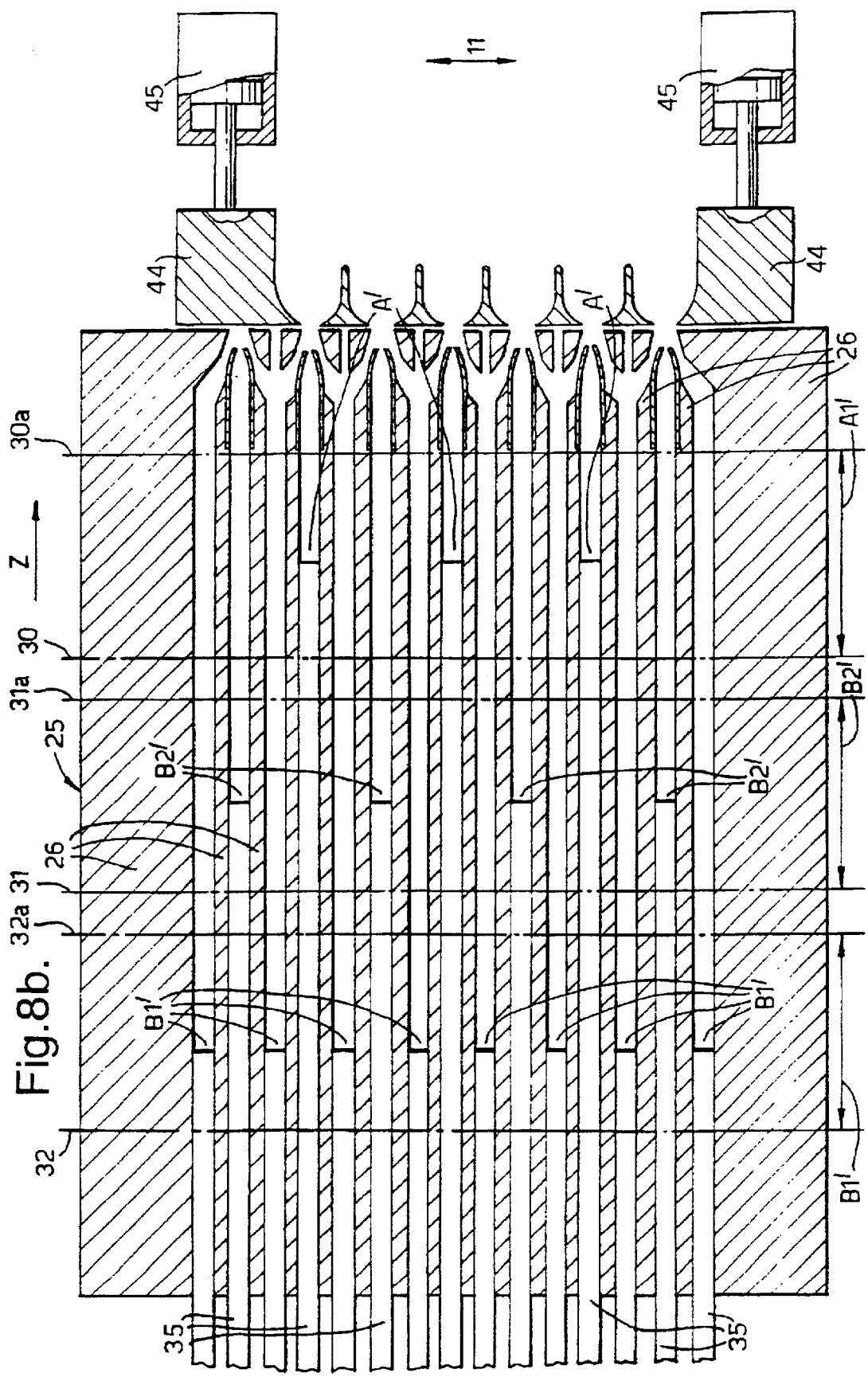

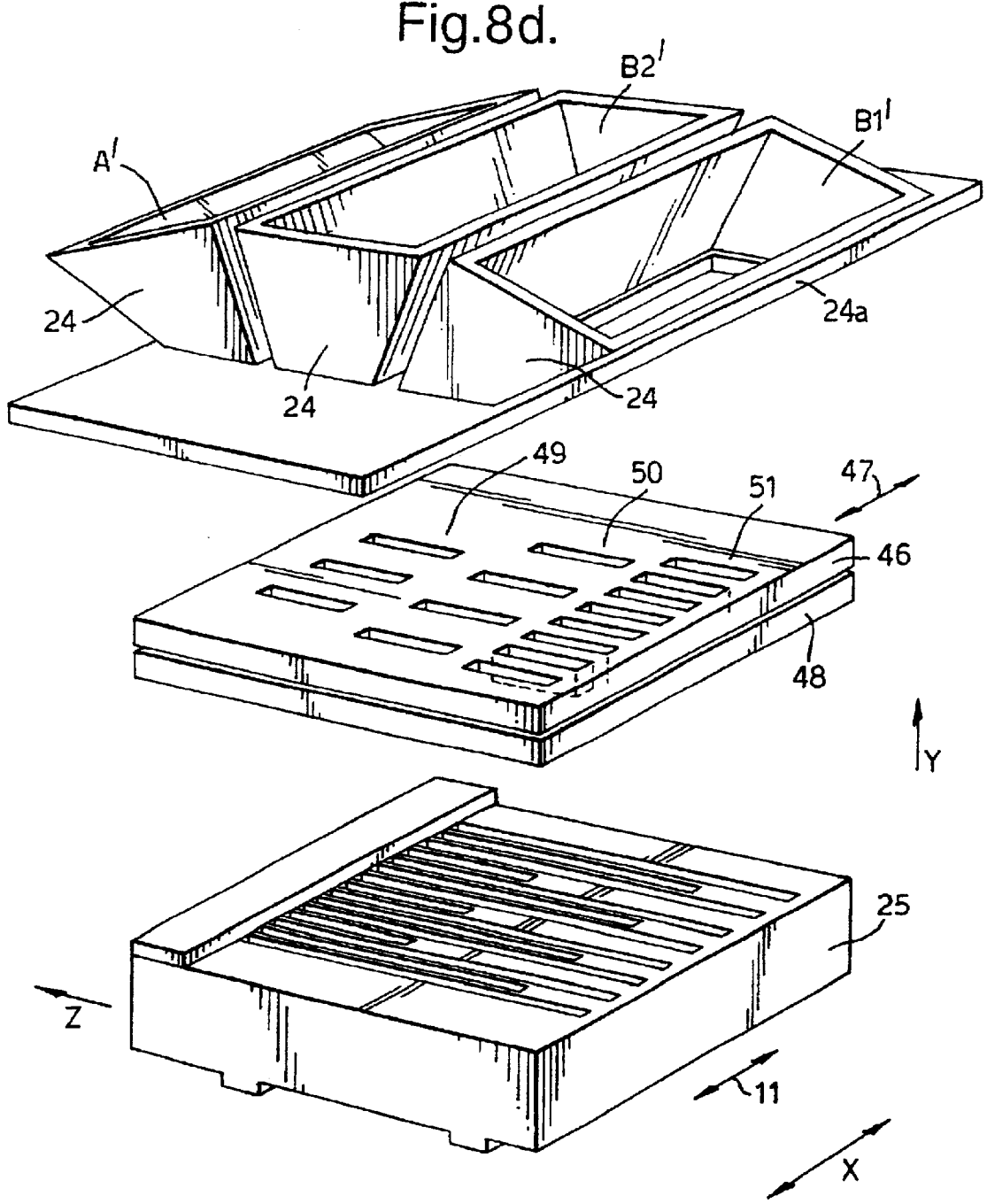

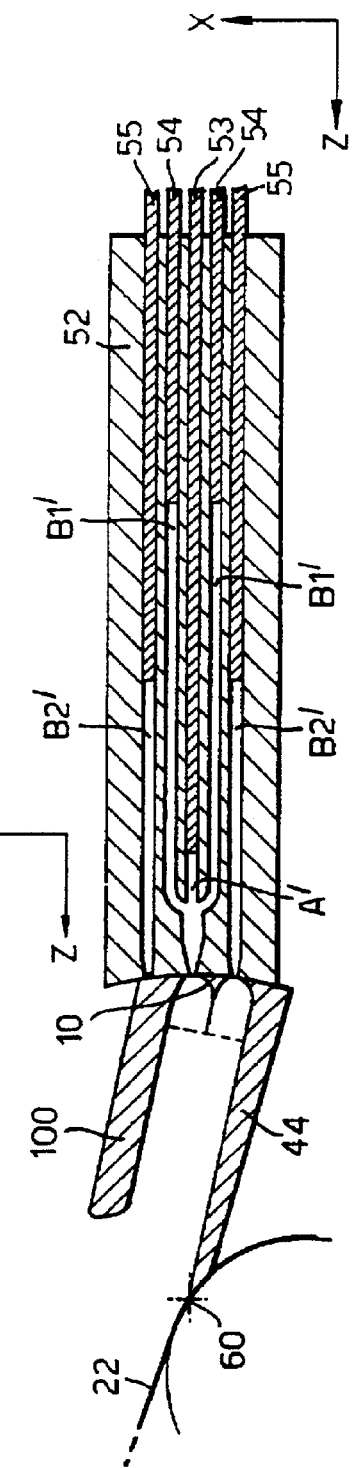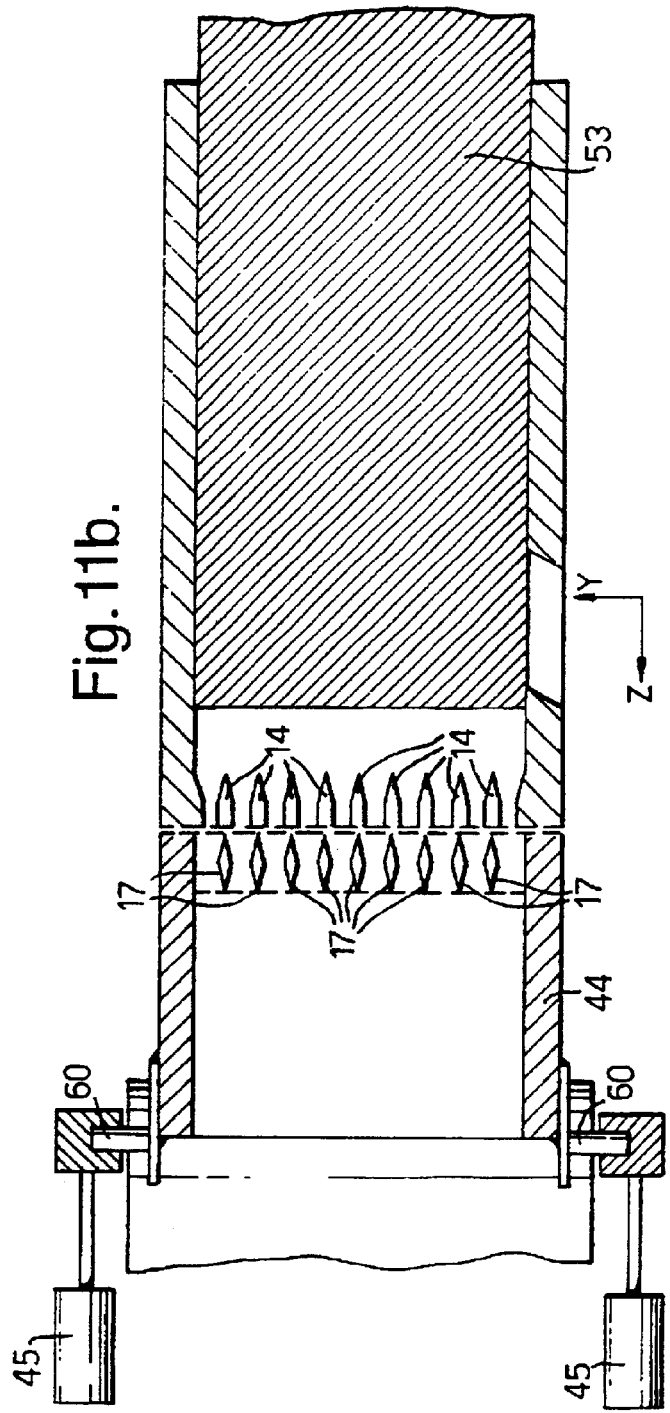

Fig. 12.
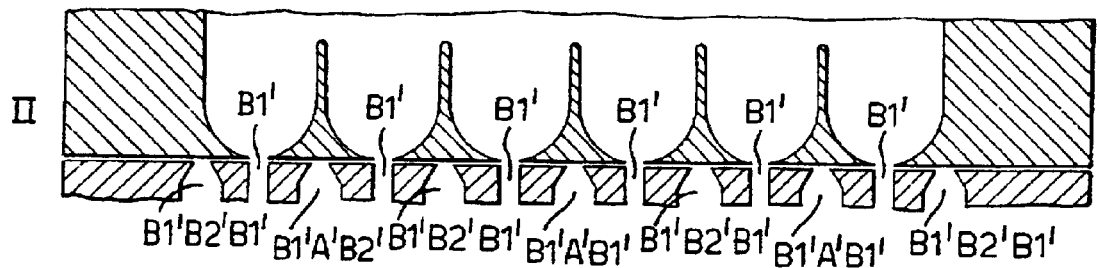
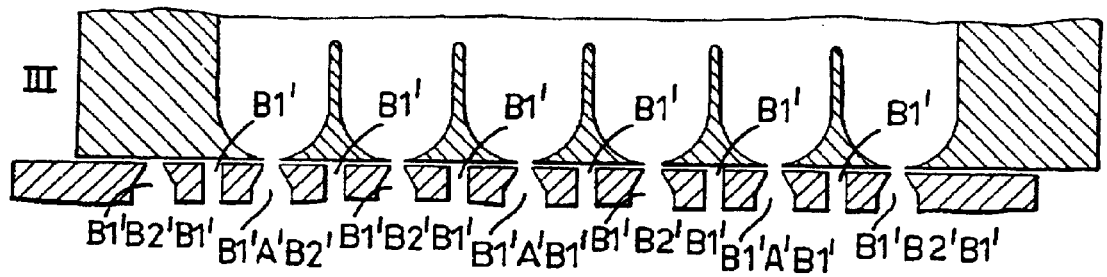
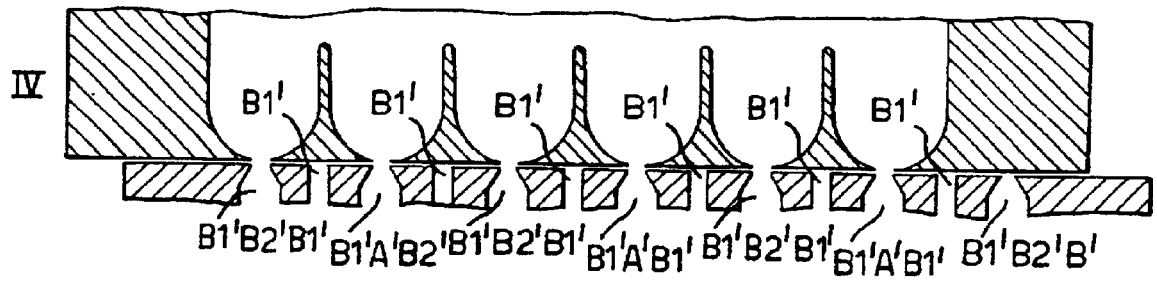
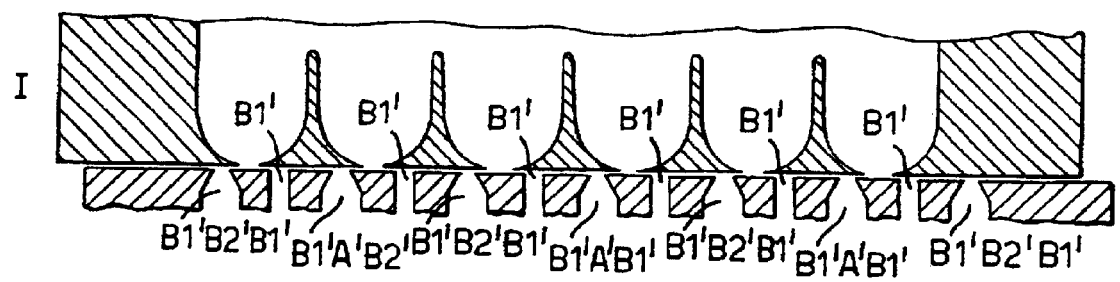

US 6,887,503 B1

FOOD PRODUCT WHICH ARTIFICIALLY HAS BEEN GIVEN A CELL-LIKE STRUCTURE BY COEXTRUSION OF SEVERAL COMPONENTS, AND METHOD AND APPARATUS FOR MANUFACTURING SUCH FOOD PRODUCT

This application is a 35 U.S.C. 371 of PCT/EP00/03713 filed Apr. 3, 2000.

The invention concerns a food product in sheet, ribbon or filament form consisting of at least two components which have been coextruded to become interspersed with each other and form a row-structure, and methods and apparatus for making such product.

In the term "food" product, I intend to include animal food, confectionary and medical products. The inventor's two (expired) patents U.S. Pat. No. 4,115,502 and WO-A-4,436,568 disclose such products. The former discloses:

a) strands of a viscous sugar solution, interspersed with strands of dough; and coextruded sheet formed product is subsequently baked—and;

b) strands of highly viscous, dissolved or swollen protein and a viscous sugar solution, caramel and/or dough; the coextruded sheet formed product is subsequently solidified. (see col. 6 line 65 to col. 7 line 5 of this patent).

The other above mentioned patent contains an operative example for making a similar food product namely example 4. Here an alkaline solution of soya protein is interspersedly, side-by-side coextruded with a solution of carboxy-methyl-cellulose to which is added caramel (for sweetening and aroma). To achieve a regular structure the two solutions have the same viscosity.

The coextruded sheet formed product is collected on a conveyor film of polyester (later to be used as wrap for the product) and is solidified by rinsing a solution of NaCl— lactic acid over it. This causes the protein to coagulate.

In each of the above mentioned examples each of the interspersed strands is a continuous strand. In U.S. Pat. No. 4,436,568 this clearly appears from the text of the example when the letter is studied in conjunction with the drawing to which it refers. In U.S. Pat. No. 4,115,502 the only apparatus/method which is disclosed for interspersed coextrusion—see FIG. 4 and connected description will always produce continuous strands. EP-A0653285 and WO-A-9934695 concern different methods of coextruding food components as a multiplicity of layer, one on top of the other, and each patent gives examples of suitable components for such structures.

Preferably the defined cellular structure extends generally throughout the product.

Compressional measurements of the resistance to deformation are commonly used in the food industry especially for the characterisation of gels.

However, to the knowledge of the inventor there exists no standardised procedure for such measurements and no specifications of what is "soft" and what is "hard", other than the standardisations and specifications used internally in companies producing food products. Furthermore, as it is well-known, the pressure required for permanent deformation in form of flow or fracture (the "yield point") cannot be indicated as an absolute value, but depends on the time-scale within which the measurements are made and to a lesser extend on the method and apparatus used. For "feel" in the mouth it is generally considered that a time scale of about 0.1 second is relevant, but the inventor has chosen to relate the measurements to a 10-seconds time scale, which is a stricter requirement.

The description in connection with FIG. 13 explains the apparatus which the inventor has constructed for measurement of compressional yield point and the procedure followed. For the purpose of this patent specification the minimum pressure which within 10 seconds gives at least 10% compression (in excess of the instant elastic deformation) is considered to be the yield value. However if B is microporous as it may be, the deformations taking place before compacting of the material should be disregarded. The following table which is made in order to corelate subjective feels with objective values indicates typical compressional yield values for misc. common products:

Dessert (e.g. creme caramel) . . . about 3 g $cm^{2}$

Marzipan: . . . about 400 g $cm^{2}$

Hardboiled egg white: . . . about 900 g $cm^{-2}$

Emmental cheese: . . . about 3 kg $cm^{-2}$

Apples: . . . about 3 kg $cm^{-2}$

Carrots: . . . about 20 kg $cm^{-2}$

Dark chocolate: . . . about 50 kg $cm^{-2}$

Fresh pine wood, in its weakest direction: . . . about 80 kg $cm^{-2}$

In the present invention, the yield point of B component or each of the B components should normally be no less than 200 g $cm^{-2}$ and more preferably not less than 500 g $cm^{-2}$ while it should preferably be no higher then 150 kg $cm^{-2}$.

Extruded food structures in which distinct particles or phases of one material is randomly distributed in a matrix of another component are known e.g. from CH-A-0538814 (cheese), U.S. Pat. No. 4,697,505 (chip cookies), U.S. Pat. No. 3,671,268 and U.S. Pat. No. 2,313,060 (ice cream), EP-A0258037 and U.S. Pat. No. 4,358,468 (meat) and EP-A-0775448 (caramel/chocolate). However the well-ordered structure of the present product, obtained by the special features of the method which is described below, enable an improved "taylor-making" of "mouth-feel" and taste.

It is further known to produce an individual encased food item or a single row or filament of encased food items, see e.g. EP-A-0246667, U.S. Pat. No. 4,828,780, col. 9 lns. 4358 and U.S. Pat. No. 4,469,475. However, the character of such products are very different from that obtained by the present invention.

A in the final form of the product, at 20° C., may be in a liquid state. Alternatively A may be of plastic or viscoelastic character for instance in the form a soft gel. A liquid or gel may comprise dispersed solids such as short fibres, nut, grain or shell-pieces, pieces of film or flake in a liquid or gel continuous phase, for instance aqueous solution or gel, or an oil. A liquid A may comprise a dissolved thickener. Another embodiment of A comprises an expanded material, such as formed by the presence of a raising agent in the extruded material. The B component or B components should preferably belong to one of the following three groups of materials:

a) firm gels, optionally with inclusion of fine preformed solid particles, b) bonded-together preformed solid particles, c) fat-based materials like chocolate.

Preferably the compressional yield point $YP_{B20}$ of B at 20° C. is at least 500 g $cm^{-2}$, for instance in the range 500 g $cm^{-2}$ to 80 kg $cm^{-2}$, generally less than 60 kg $cm^{-2}$.

The product A preferably is fluid, or is a gel or plastic or plastic or pseudo-plastic material which has a compressional yield point $YP_{A20}$ at 20° C. which is less than 1000 g $cm^{-2}$ and more preferably less than 500 $cm^{-2}$.

In the present invention a gel is understood to be a three dimensional network formed of polymeric components, whether linked by chemical bonds or crystallites, or some other kind of junction, swollen by a liquid, which is generally self supporting, for instance when placed on a flat surface, rather than being fluid.

It is immediately understandable that the invention provides a new concept for achieving a food product which on the whole has a solid and mechanically stable consistency and nevertheless is pleasantly chewable and in all respects makes a natural feel in the mouth, be it a substitute of meat, a filled chocolate, another type of confectionery, a snack, snack-masked medicine, or a completely new combination of food ingredients. While A e.g. can be a continuous soft gel of plastic character within each platelet or lump, it is essential that B also can be a continuous gel, but in this case a firm gel.

Later in this specification the possible compositions of A and B will be further described.

The short reinforcement fibres or grain-, shell or film-pieces or flakes in some of those claims in relation to components A and B are preformed, and are preferably but not necessarily digestible, or of value for the digestion e.g. short protein fibres. An important example of applicable shell-pieces (or husks) is bran. They may contain absorbed aroma substances or the protein used for the fibres or film-pieces may have been brought to react with carbohydrate to form a caramel related compound.

As it is understood from the above, B forms "cell-walls" and A the "cell-contents". Typically the biggest average dimension of the cell is between about 1–30 mm, and the smallest dimension about 0.1–3 mm. Due to the characteristics of the extrusion process, the cells are almost always of a curved shape, although exaggeration of such shape can and preferably should be avoided. The indication of the biggest dimension refers to measurements along the curved surface of the cell.

The cross section of cells of A in the xz plane generally has an average dimension in the z direction in the range 0.5 to 10 mm, preferably in the range 1 to 5 mm. Generally the cells of A have an average cross sectional area in the xz plane in the 0.5 to 100 mm², preferably in the range 1 to 25 mm².

In the majority of the cells the thickness of the cell wall should preferably not at any place be smaller than 2% of the average thickness of the lump or platelet which is contained in the respective cell, since otherwise the mechanical stability may be insufficient. More preferably it should not be smaller than 5% and still more preferably 10% of the said average thickness.

In the invention the average row separation is preferably in the range 1 to 25 mm, more preferably 3 to 15 mm for instance 5 to 10 mm. Generally the boundary cell walls have a minimum thickness in the x direction in the range 5 to 50% of the average row separation, preferably more than 10%.

The bridging cell walls, that is cell walls of B, between cells of A other than boundary cell walls, have a minimum thickness of 0.1 mm, preferably a minimum thickness of 0.5 mm.

On the other hand, to give the product a suitable consistency, the average wall thickness in the majority of the cells should normally not exceed the average thickness of the cell of A.

In most cases when A is fluid, the nesting of A in B should preferably be a full encasement in three dimensions at least for the majority of the platelets or lumps. This is the more advantageous the more fluid A is.

The most advantageous row-formed cell structure is the composite structure with boundary cell-walls and, branching off herefrom bridging cells-walls, in a generally x-wards direction, for instance as stated in claim 3 and illustrated in FIG. 1a. In this drawing there are shown two B-components B1 and B2 (and the reasons for using 2 B-components as shown will be given below) but the drawing must be understood so that B1 and B2 can be one and the same component.

The coextrusion method for producing this structure may cause some attenuation of A as well as B close to the locations of cell wall branching, see FIG. 3. By appropriate choices of the conditions during the extrusion such attenuations should preferably be limited so that the thicknesses of a branch and a boundary cell-wall both measured at the location of branching-off, should generally not be any smaller than $1/15$ of the biggest thickness of the branch.

More preferably not smaller than $1/10$ and still more preferably not smaller than $1/5$ of said biggest thickness.

To facilitate chewing of the food product and make it feel most natural in the mouth, B may be selected to have stronger cohesion than adhesion to A. This effect can be achieved by addition to B of a substance which promotes the slip, e.g. a fat to a hydrophilic B-substance.

Contrarily there may be a need to strengthen the bonding between A and B, and this can be achieved by providing that the boundary cell walls of B extend in a waved or zig-zagging manner about a generally zy plane.

Within the product having boundary cell walls of B, each cell of A may bridge the whole way between the boundary cell-walls. This is shown in FIG. 1a and will in many cases give the best consistency of the product. However, the cells of A can also depending on the method of manufacture and further dealt with later be included as shown in FIG. 2, or in a less ordered manner but still exhibiting a row structure.

The additional cell-wall serve to perfect the nesting of A in B, and are illustrated in FIGS. 1b, c and d.

A and B may in fact each comprise more than one component. Very advantageous example of B comprising 2 components B1 and B2 (joined adhesively with each other) and illustrated in FIGS. 1a and b, 4a and b, preferably exhibiting a compressional yield point which is at least double that of B1. More preferably the yield point $YP_{B120}$ of $B_1$ at 20° C. is in the range 0.1 to 0.5 of the yield point $YP_{B220}$ of the $B_2$ at 20° C. Thus B2 may e.g. be tougher than B1 (in the final state of the product) depending on the method of manufacture and further dealt with later so that B1 easily is disrupted by the chewing to release the (tasty) A-, while the consumption of B2 requires more chewing work—which is felt as a good combination. Furthermore when B2' is less deformable than B1 in the state it has during and immediately after the dividing in the coextrusion process, B2' helps to achieve the most regular cell structure. (In this specification the extrudable material used to make A of the final product is referred to as A' during the process; likewise extrudable B' forms B after processing, B1' forms B1, B2' forms B2 etc.

In one embodiment B1 is twisted around cells of A. The twisting can take place by the flow alone when the extrusive conditions for this are selected so that the segments of A' rotate. This is further explained in connection with FIGS. 7a, b and c.

The boundary cell walls of B extending generally z-direction may be molecularly oriented in the generally z-direction. This is achieved by using suitable extrusion methods and apparatus. The orientation helps to make the product feel like meat when it is chewed.

The incorporation of a pulp of short protein fibres or pieces of protein film in A, has a similar purpose as the orientation and also purposes connected with the taste and nutritional value. Component A alternatively can consist of other short fibres or film pieces or of nut-, grain-, or shell-pieces, or flakes. Also in this connection, grain can be very suitable. When A is a cultured milk product, it can either be given sweetness and aromatic taste for use in the product as confectionary or dessert, or be spiced like "chutney" for products used in a first course or main course.

The incorporation of gas in the A cells is normally achieved by use of an expansion agent like the expansion of dough in breadmaking, or the expansion of vegetable protein with evaporating water in the conventional extrusion of meat substitute.

In bread or cake products, the B-component (cell-walls) based on protein serves to give the product a good mechanically stability even when the contents of the cells are very fragile (second grade flour or high contents of grain) or the product is very expanded. The use of cheese for the cell-walls is mechanically suitable and provides an interesting taste combination.

In an embodiment B is a microporous agglomerate of particles containing water in the pores, and that the said particles consist of short fibres or grain-, shell- or film-pieces or flakes, which particles are bonded together by polymeric micro-strands, e.g. consisting of coagulated gluten or a natural or synthetic rubber as produced by coagulation of a latex.

In another embodiment, which may be a meat substitute, A comprises two separate components:

A1) a semi-solid fat or oil based component containing the fat/oil soluble ingredients, and A2) a juice containing the water soluble taste ingredients, B) a component suitable for chewing.

In the first independent method claim, a method is defined which is suitable for producing the new product (though not restricted thereto). In the method, cells of A are formed by extruding an extrudable material A' and coextruding an extrudable component B' which forms D and in the method flows of A' and B' are adjacent to one another in a direction transverse to z, the flows of A' and B' being regularly divided generally transverse to the direction of flow by a dividing member to form flows of A' and B' segmented in the z direction, a segment of flow of B' being joined upstream and downstream to each segment of flow of A, the process being characterised in that B' is transformed to a harder material B after extrusion, the yield point being at least 20 g cm$^{-2}$.

In the first aspect of the method of the invention, after exit from the extruder B' as modelled around A' segments so as to surround the A' segments substantially completely in an xz plane. Furthermore, preferably A' is formed into at least two flows, and two rows of segments of A separated by a boundary cell wall of B are formed to form the novel product.

The claims define further a second method aspect of the invention. This aspect is defined in the second independent method claim. Preferably several flows of components A' are formed interposed with flows of B'. The dividing members reciprocate or rotate relatives to the extruder exits to form segmental streams whilst modelling B' around A'.

The second method aspect of the invention may be used to extrude food products or may alternatively be useful for extruding other extrudable materials such as thermoplastic plastics materials. When the method is used for extruding food, preferably B' is transformed after extrusion to a material having a higher yield point as the first method aspect of the invention.

There are several ways of providing relative movement between the dividing member(s) and extrusion exits.

In one preferred method of the invention, the relative movement is provided by fixing the extruder components including the channels and exits, and moving the dividing members. For instance, the x direction may be arranged substantially vertically, with one or more flows of A' having flows of B' above and below, and to provide the extruder exits on a circular cylindrical surface having a substantially horizontal access. The dividing member is pivoted around the said horizontal access so that the dividing members reciprocate on the said circular cylindrical surface. One extruder suitable for putting this embodiment into effect is illustrated in FIGS. 11a and b.

Another way of carryingout the second the second aspect of the method invention, is for direction x to be substantially horizontal, and for flows of A' and B' to be arranged in a horizontal array, with flows of B' between flows of A', and with the dividing members reciprocating or rotating in a generally horizontal direction.

It is to be understood that the direction of extrusion of the component A' and B' is in a generally z direction, that is it should have a component of movement in the z direction. However it may additionally have a component of movement in the x or y direction. Furthermore components A' and B' may be provided with movement in a direction having components of movement in the same or different x or y directions.

Whilst the invention has been described, and it described in the following S description as being from a conventional flat-die, with components and directions defined by reference to an orthogonal coordinate system based on the x, y and z axes, the dies may alternatively be circular, in which case the coordinates could alternatively be replaced by r, θ and z. The direction of extrusion, that is of flow of A' and B' from the extruder exits may be in the z direction, the r direction (either inwardly outwardly directed) or substantially the θ direction. Where the extrusion is in a generally z direction or generally r direction, the dividing members preferably rotate or reciprocate in the θ direction. Where the material exits from the extruder in a r direction or θ direction it may alternatively be possible to reciprocate the dividing members in a z direction. Apparatus adapted from the inventor's earlier apparatus described in U.S. Pat. No. 3,511,743 or U.S. Pat. No. 4,294,638, both based on circular dies, could be utilised in such embodiments.

This type of coextrusion belongs to a "family" for which the inventor in the past introduced the name "lamellar extrusion". This signifies a coextrusion method by which two or more extrudable components first are interspersed with each other in a sheet-like array of flows which then are mechanically sheared out by means of transversely moved dieparts in a way that produces a sheet of thin lamellae—continuous or discontinuous—which are positioned at an angle to the main surfaces of the sheet.

To the knowledge of the inventor the only published inventions within this "family" are contained in French patent no. 1,573,188 issued to Dow Chemical Limited., and those patented by the inventor of the present invention, comprising the two U.S. patents mentioned in the introduction to this specification (and counterparts in other countries), and further, referring to U.S. patent numbers, the following: U.S. Pat. Nos. 3,505,162; 3,511,742; 3,553,069; 3,565,744; 3,673,291; 3,677,873; 3,690,982; 3,788,922; 4,143,195; 4,294,638; 4,422,837; and 4,465,724.

Only the two patents mentioned in the introduction to this specification by the present inventor disclose the use of lamellar extrusion for manufacture of food products, and as mentioned the components are not formed in to segments according to these disclosures. The disclosures in the other patents are limited to synthetic polymers with a view to the manufacture of textiles or textile-like materials, and in a few cases reinforced board materials. The modelling of one component around segments of another component is not disclosed, neither is there disclosed any formation in these synthetic products of a cell structure comparable to the cell structure dealt with in the present invention.

EP-A653285, which has been mentioned earlier in this specification, uses the interspersion method disclosed in the above mentioned U.S. Pat. No. 3,511,742 and in several of the other above mentioned patent specifications, to produce a multi-layered food product in sheet or plate form. The layers are not "lamellae" but are parallel to the main surfaces of the sheet/plate and are not broken up into segments.

For establishment of the cell structure according to the invention it is essential that the segments of B become modelled around the segments of A. One way for achieving the modelling is by requiring that the B' has a lower viscosity, and yield point if any, under the process conditions which is significantly lower than those of A'. Preferably the viscosity and or yield point is less than 0.5 the viscosity or yield point, as the case may be, of A under the process conditions. A further improvement is achieved by minimising adhesion of the A' to the dividing members by incorporating an oil or fat in A'.

An alternative or supplementary way of achieving the modelling of B' around A' is by merging the flow of A' with a flow of B' on each side (in the x direction) prior to the extruder exit. This embodiment will be described in more detail below.

At the time of dividing, A' should preferably not be liquid, but can be plastic, pseudoplastic, gelformed, can be a dry powder or in other way a particulate material. In each case it means that, very generally speaking, a certain minimum value of shear force is needed to cause permanent deformation under the conditions in the die.

B', on the other hand, (or B1 if there are two B-components in the arrangement shown in FIGS. 1a and 4a) should at this stage of the process be of a fluid to plastic consistency and generally exhibit a lower resistance to permanent deformation. It should preferably have plastic consistency in order to make the extruded product self-supporting as it leaves the die.

The ways of interspersing the components with each other and to carry out the movements which cause the dividing of the flows of A' and B', may be based on the patents on lamellar extrusion, which are listed above.

As well as being a relative recprocation between the channels and orifices on the one hand and the dividing members on the other hand, it may be advantageous to provide for the relative reciprocation or rotation between the row of dividing members and the exit chamber, (which is known per se from the mentioned patents) serves to arrange the filaments in the final product in a generally transverse direction (if this is wanted) and/or to increase the bonding between the filaments.

In order to optimise the shaping of the segments in the dividing process this should preferably take place by shear between on one side the internal orifices through which the mutually interposed narrow flows are extruded, and on the other side the row of dividing members, and furthermore best by cutting action. Examples of the shape and positioning of the knives for this action are shown in FIGS. 6a and 9. By means of the severing action and/or the "microsawing" it is possible to form very fine slices of the components even when these contain pulp or fibres.

The dividing of the narrow flow to segments is preferably carried out in rhythmic operations with the dividing members acting as shutters (i.e. being of a width so as to be able to completely shut off the orifices), and furthermore with at least component A' extruded in pulsations such that maximum driving force of the material A' through the channel is imposed while the orifices for A' are open. These features are shown and further explained in connection with FIG. 8. The pulsations are preferably produced by a ram for each narrow flow of the component, localised at the entrance to the chamber for the narrow flow—see FIG. 8c—and optionally extending into the chamber. It depends on details of the process and the choice of component whether the flow mainly will be caused by the conventional feeding means (e.g. a pump or an extruder) optionally in combination with intermittently operated valves or by the above mentioned rams.

The use of intermittent extrusion in connection with lamellar extrusion is known, with other aims, from the above mentioned U.S. Pat. No. 3,788,922 see col. 2, lines 5164, col. 3, lns 4–13, col. 4, lns. 4553, example 1 and example 2. This patent discloses the use of shutters to achieve the intermittent extrusion, but does not disclose that the dividing partitions can be used as shutters. Furthermore it discloses the use of a vibrating piston to cause the pulsations, but this is a piston between the extruder and the die instead of (as in the embodiment of the present invention) one ram (piston) for each narrow flow and installed in the die itself.

Generally speaking, two generally yz surfaces of each segment of A' are covered mainly by the part of B' which is joined with A' prior to the dividing, and the two xy surfaces of the segment of A' is covered mainly with B' from those internal orifices which carry B'-component alone. This provides improved possibilities for controlling the thickness of the B' layer in contact with the dividing member.

A modification of this embodiment of the method comprises the use of two B'-components B1' and B2'. It is shown in principle in FIG. 7a, and with further details of the entire extrusion in other drawings as will become apparent from the detailed description of the drawings. In connection with the description of product there has already been discussion of the advantages of this modification, and it was mentioned that, provided B2' is less deformable than B1' in its state during and immediately after the dividing, B2' helps to achieve the most regular structure. This should be understood so: B2' should normally be easier to bring to flow than B1'. However, the higher flowability will mean that the backpressure tends to squeeze B2' towards the walls of the dividing members, whereby the "boundary cellwalls" may become thicker than wanted, while the "bridging cellwalls" may become thinner than wanted. The use of B2' component which shows more resistance to flow than B1' can fully solve this problem. B2' can also, if wanted, have exactly the same composition as B1', but be fed into the extrusion apparatus at a lower temperature to give it higher resistance to deformation, e.g. it may be semifrozen.

It has already been mentioned that in many cases the nesting of the segments of A' in B' is most advantageously a full encasement. The method of the invention comprises two alternative embodiments (which can be combined) to achieve such structures, and illustrated in FIGS. 7b and 11b. The use of internal orifices which extend or are interrupted is dealt with here is known from the inventor's earlier patents on lamellar extrusion, but neither for the purpose of producing food products nor for production of any cellular structure comparable in geometric to the structures of this invention.

After the extrusion process, component or components B' must be transformed to a firm cohesive form (optionally this transformation may already start before the dividing process) while component A' may remain generally as it was during the dividing, or be transformed either to become more "fluid" or more fragile.

In preferred embodiments of the method B' is transformed to harder B by cooling, normally after melt-extrusion. Examples are:chocolate, swollen soya protein or gums. In some cases, when the process is sufficiently slow, e.g. consists in the formation of a gel, cooling of a fluid or plastic solution formed at a relatively high temperature e.g. about 100° C. can be carried out prior to the extrusion, which then can be established at normal ambient, or lower temperature. Examples: adequately strong colloidal solutions of gelatine, carregenin or Ca-pectinate. Examples of solidification effected by heating of a colloidal solution: adequately strong colloidal solutions of egg albumin or gluten (or gluten-reinforced dough). Examples of reestablishment of the continuity in a previously disrupted gel are: a thixotropic colloidal solution of carregenin with addition of potassium ions (reestablishment on storage for a short time); heating/cooling of disrupted gels of casein or soya protein or starch.

It may be possible for the transformation of B' to B to be the formation of a firm gel by a chemical reaction which is sufficiently slow to allow mixing of the reactants (in B') prior to the coextrusion. As an example, colloidal solutions of pectin or alginate, with additions of Ca-ions and an enzyme which gradually demethylates the polymer, whereby the Ca-salt precipitates as a gel, would be suitable.

Another way of carrying out the transformation to harder B is the formation of a firm gel by chemical reaction between reactants in the B'- and A'-components for instance so that reactants in A' gradually migrate into B'. To gel a B' component which is a colloidal solution of demethylated pectin or alginic acid, there may be used as reactant in the A-component ions of Ca, Mg or Al. Coagulation by change of pH can also be used. As a precaution to fully secure that internal orifices are not blocked by such gel formation, the letter may be adapted in a way which requires a simultaneous change of pH and introduction of such metal ions. In such cases there is used two channel systems for component A', one to carry the said metal ions and introduce it into the B-"cellwalls" from one side, and the other to change pH from the other side of the B-"cellwalls".

Depending on details in the parameters of the extrusion process, a B'-component in form of a colloidal solution will normally become molecularly oriented while it flows towards and through the internal orifices and proceeds along the walls of the dividing members. This orientation can be "frozen" if the gel formation by use of a reactant from the A'-component is sufficiently fast. The material of B is thus often oriented in the boundary cell walls to be directed in the generally z-direction. The "frozen" orientation helps to make the product feel like meat when it is chewed.

As another means for transforming B' to a harder material B preformed solid particles are coagulated to continuous firm matter: fine disperse particles of soyaprotein in a solution containing Ca-ions. The particles may be short fibres, in particular flat fibres which may be so short that they are platelets. For economical reasons flat fibres or platelets from expanded, oriented, fibrillated protein film is preferred. This is particularly useful for the B2'-component in the structure shown in FIGS. 1a, 6a and b, as made by the apparatus shown in FIG. 8. The protein from which the fibres are formed may have been brought to react with a carbohydrate at an elevated temperature to form caramel-related compounds. When there are two B-components B1' and B2', arranged as explained in the foregoing, one method of giving B2' the desired consistency before the dividing (cutting) process, is to form B2' into a gel, at least in part, while it proceeds as narrow flows towards the dividing (cutting) process. This can in some cases be done by admixing a reactant immediately, before B' reaches the channels for the narrow flows, and in some other cases by high frequency heating while B' proceeds in the narrow flows towards the array of internal orifices.

Keeping in mind that A in the final product must be more flowable or contain gas, A may in some cases remain in the same generally plastic, gel-form or foam-form state which it had (as A') during the dividing and modelling processes, but in most cases it should either be transformed to a more flowable or more fragile form. More flowable especially when a juicy performance is wanted in the mouth when the "cellwalls" have been broken by chewing.

When A' has a high content of water, there are two ways of making A' adequately semisolid to solid during the dividing (cutting) and modelling process steps, and later more flowable. One way is by freezing and late melting an adequate part of the water or crystallizing sugar and/or other substances dissolved in the water, and later letting it dissolve or melt again.

Another way is by use of depolymerisation (hydrolyses) after the extrusion process, preferably by enzymes, such as protease enzymes.

When A' is in frozen or preferably part-frozen state during the extrusion, freezing of B should normally be avoided, except in the case that the or one of the B' components is also to be cooled to below or about the freezing zone, but B' should preferably prior to the extrusion be cooled down almost to its freezing point and the extrusion process should be carried out as fast as practically possible. The chambers for the narrow flows, and the row of dividing members should in such cases normally be made from metal and then kept at a temperature near the freezing point of B'. Melting of a film from A' during the passage through the die will normally be advantageous rather than harmful, because of the lubrication effect, provided the extrusion velocity is sufficiently high and this film therefore thin.

In order to keep the icecrystals bonded together to an adequate plastic consistency, there should preferably be some amounts of sugar or a watersoluble polymer (e.g. guargum or partly depolymerised protein) mixed into the A'-component, and dispersed shortdigestible fibres are also helpful in this connection.

When leaving the die the product will normally be supplied to a conveyor belt or directly collected in trays and may before this collection or on the belt be cut into suitable pieces. The faces where it has been cut ("the wounds") may be sealed if desired or necessary (to prevent leakage of fluid A) by conventional means. Optionally the entire piece may be enrobed e.g. in a thin film of chocolate.

If the transformation of B' to a firm form B is carried out by heat treatment, this treatment is best done while the product is on the conveyor belt or in the abovementioned trays, and can be by means of microwaves, high frequency heating, contact-heating or by hot air.

Dividing of the extruded continuous product into longitudinal segments can be rationalised. E.g. the extrusion of A-component can be stopped during time intervals long enough to produce a transverse band of plain B components through which the product can be cut without making a "wound". Alternatively the extrusion of B can be interrupted during time intervals long enough to produce a transverse band of plain A-component, through which the continuous product easily can be separated into longitudinal segments without any need to cut, and the "wound" can then be washed clean of A component (which can be recycled).

Such precautions are normally unnecessary if A in the final form is firm or semifirm (e.g. marzipan or a fruit paste encapsulated in chocolate) since in this case simple cutting may be fully satisfactory.

Examples of different kinds of products according to the invention.

I): Confectionary
  1): A: powdered hard caramel and/or finely divided nuts, "sintered" in the extrusion process.
      B: chocolate, semimolten during the extrusion process.
  2): A: Marzipan, or sweet fruit-mass thickened with soluble protein. B: see I) 1)
  3) A: Icecream, e.g. chocolate icecream, or sweetened frozen yoghurt, melted after the extrusion process.
      B: A firm gel of pectin, in disrupted disperse state during the extrusion process and subsequently regenerated by heating and cooling.

When A is based on chocolate icecream with vegetable fat instead of milk fat, 3) can be a suitable substitute of chocolate bars made without use of fatty acids.

II) "Hybrids" between confectionery and protein foodstuffs.
  1) A: cheese extruded in plasticised state.
      B: see I) 1)
  2) A: see I) 1)
      B: a disrupted firm gel of soyaprotein or casein, regenerated by heating and cooling.

III) Meat-like foodstuff on basis of vegetable protein.
  1) A: a strong soup, or yoghurt with herbs and spices ("chutney"), with addition of small amounts of a thickening agent; in frozen doughlike state during the extrusion process.
      B: see II) 2).
  2) A: during the extrusion: soya flour dispersed in water thickened by means of part-hydrolysed soyaprotein, and with spices and other aromatic substances, plus proteinase added—after the extrusion: hydrolysed by the proteinase.
      B: see I) 3).

IV) Cellular products with contents like sausages.
  A: a paste as normally used in sausages, optionally with addition of part-hydrolysed soyaprotein as a thickening agent.
  B: see II) 2), or I) 3) or a firm starch gel, disrupted before the extrusion and regenerated by heating/cooling.

This is e.g. a new and advantageous way of using 2nd grade products from the slaughteries.

V) Bread or cake like products.
  A: Conventional dough with expansion aid.
  B: See II) 2)

The product is baked, whereby the cell structure helps to obtain a fine and even expansion.

The invention will now be explained in further detail with reference to the drawings. In several of the figures there is shown a system of coordinates x, y and z. These coordinates correspond to the indications in the claims and in the general part of the description.

BRIEF DESCRIPTION OF THE DRAWINGS

FIGS. 1c and d show in x-y section two different modifications of the arrangement shown in FIGS. 1a and b.

FIG. 3 shows in x-z section, a type of A/B-structure which normally should be avoided, but can be useful in cases where the visual effect is most important.

FIGS. 11a and b show, in sections y-z and x-z, respectively, another embodiment of the methods an apparatus suitable for making the same kind of products. In this embodiment the dividing movements and the x-direction are generally vertical, while the y-direction is generally horizontal.

FIG. 12 shows in detail the four different positions between the reciprocative movements by which the dividing takes place in the apparatus of FIGS. 8a, b and c. This figure is made in support of the description of a program for coordination of the different movements and stops.

The typical cell-like structures of the invention, shown in FIGS. 1a and b are first formed as segmental "filament" structures (see e.g. FIGS. 4 and 5), and several such "filaments" are then joined to "ribbon" or "sheet" form. The dotted lines (1) indicate the borders between the filaments, where the bond may be so weak that the filaments easily separate from each other in the mouth. This can be advantageous, but the B-material from two neighbour filaments may also be so intimately connected that the borderline hardly can be found in the product.

Referring to the terms in the claims, (2) are the boundary cell walls, (3) the rows of A-cells, (4) the bridging B-cell walls extending generally in z y planes and x y planes, and (5) the bridging B-cell walls extending generally in the x z plane.

These drawings show the presence of two B-components, B1 and B2, of which B1 mainly occupies the boundary cell walls (2) and the bridging cell walls (5) which extend generally in the x z plane, while B2 mainly occupies the bridging cell walls (4) which extend generally in z y planes and x y planes. However depending on the construction of the apparatus (see later), (2) and (5) may also each be partly B1 and partly B2. There are different reasons for using two B-components. One which later will be discussed concerns the manufacturing process, but to this comes that relatively soft or fragile boundary cell walls (2) give a quick release of a fluid (tasty) A-component in the mouth. while relatively tough bridging cell walls (4) give extra chewing work after release of the tasty component. Both of these effects are felt pleasant in the mouth.

However, still with reference to FIGS. 2a and b, B1 can be identical with B2, i.e. there will be only one B-component. It will become clear from the apparatus drawings with connected description how these different products can be made.

In FIGS. 1c and d the rows of A-cells are mutually displaced in two different ways. The manufacture of these structures are briefly mentioned in the descriptions to FIGS. 7a+b+c, and 11a+b, respectively.

Figure 1A:
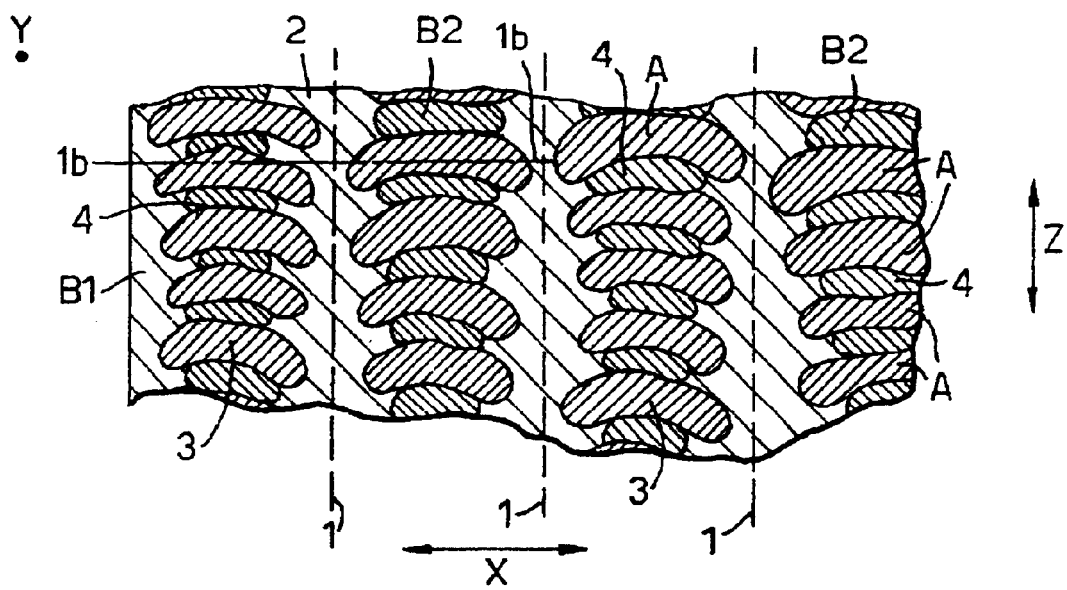
FIGS. 1a and b show in the x-z and x-y sections, respectively, and a particularly regular arrangement of the row structure according to the invention with A as "cells" and B1 and B2 as "cellwalls".
Figure 2:
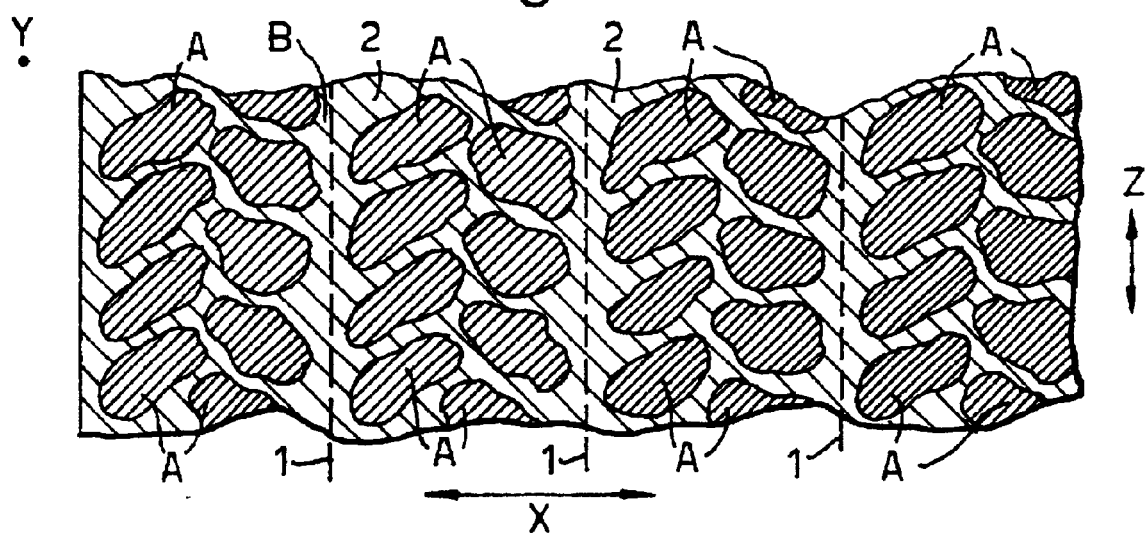
FIG. 2 shows, in x-z section, an A/B "cell structure" in a less regular arrangement of the rows, but still falling under the product invention.

Depending on the rheology of the components during the extrusion, the length of the A'-segments cut, and other details in the extrusion process, the structure of the final product may deviate considerably from the regulatory shown in FIGS. 1a to d, but still fulfilling the purposes of the product according to the invention. FIG. 2 is an example of such less regular structure. It should be mentioned that the cells also can be made almost spherical, namely by causing each small lump of A' to rotate in the exit part of the coextrusion die. This is further explained in connection with FIGS. 7a, b and c.

In FIG. 2 the cells have a relatively pronounced curved shape (pointing in the direction of extrusion) which is a result of dragging during extrusion. Even in the almost ideal structure of FIG. 1a there is shown some curvature. Such shapes or "deformations" of the structure are normally not intended but almost unavoidable due to the friction while the segmental stream passes between the dividing members (and show that the product is an coextruded product). However, if such deformations are exaggerated as shown in FIG. 3, they may be harmful. This can happen by inadequate choice of rheology for one or more of the components and/or insufficient modelling of B' around the segments of A'. One of the product claims states preferable limits for the "deformations" in the B-structure. The reference to thicknesses in this claim is illustrated in FIG. 3 as follows:

the smallest local thickness of a branch in the vicinity of the branching off is shown with arrows (6), the smallest thickness of the boundary cell-wall in the same vicinity by arrows (7), and the biggest thickness of the B-branch by arrows (8).

The biggest thickness of the branch is defined as follows:

from a point of the convex surface the distance to each point on the concave surface is measured, and the smallest distance so found is registered. This is repeated for every point on the convex surface. The (indefinitely many) registered minimum values are compared, and the biggest one so found is the maximum thickness of the branch.

It should be noted that there are cases especially within the confectionery industry where the protecting effect of B is unessential, while there can be advantageous aesthetical values of the patterns of different segments, when the components have different colours or are dark/white, and not least an "abstract" pattern like that of FIG. 3 can be interesting. In such cases the product is preferably cleaved (cut) "horizontally" to expose the segmental structure best possible. In these very special cases, the modelling of B' around A' can be omitted, so that there will not be formed any boundary cell-walls of B', but each segment may become "indefinitely" attenuated at the boundaries.

Examples: dark chocolate/white chocolate, dark chocolate/marzipan, white chocolate/caramel, two differently coloured gums.

Figure 4:
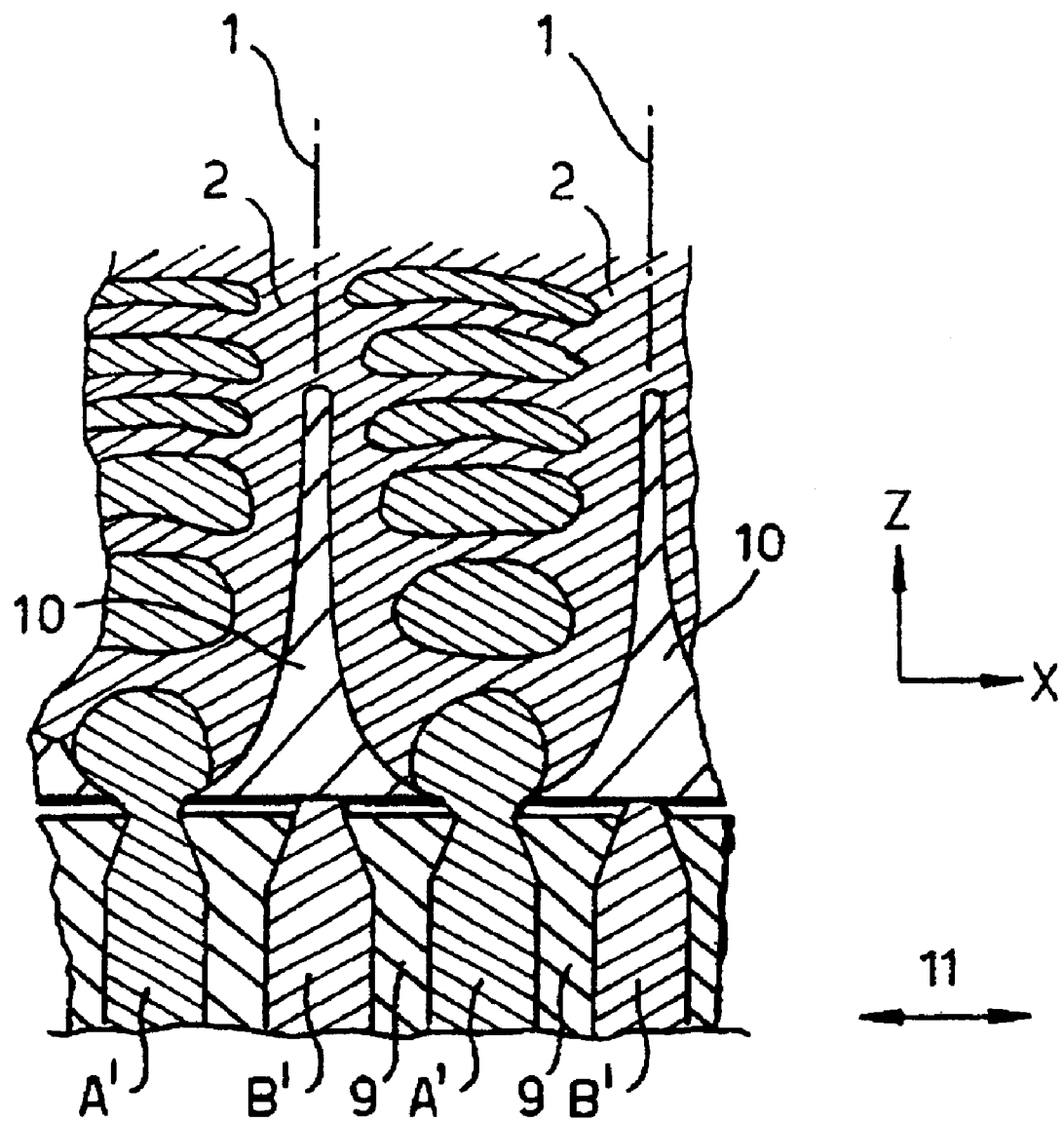
FIG. 4 illustrates in x-z section the modelling of component B' around each segment of component A' mainly by rheological means.

The simplest way of modelling component B' around small lumps of component A'—seen from a mechanical point of view—is the method which is represented by FIG. 4. This shows a section of the last part of the reciprocating "interpositioning" part with internal orifices defined by elements (9), and of the fixed exit part (44) with dividing members (10), each one here shown as a "double knife". The drawing further shows a transformation of separate A' and separate B' flows into segmental A'/B' flows, which then join and form the structure shown in FIG. 1a (but with only one B'-component).

The reciprocation is indicated by the double arrow (11). The drawing shows the moment when an internal orifice for A' defined by elements (9) matches with an opening defined by members (10), i.e. just before cutting of a segment of A'. A' has begun to follow the surfaces of (10). However, the channel defined by these surfaces widens, and when B' flows easier than A' and/or A' shows a lower tendency to sticking, A' will tend to slip away from the surfaces of (7) and become surrounded by B.

Generally component A' should be of plastic, not truly liquid character. B' may be a viscous liquid or better also of plastic character, but should preferably be more fluid than A' (i.e. show lower compressional yield point as defined herebefore). Hereby the back-pressure in the exit part, however, will press B' towards the surfaces of the dividing members, so that the segments of A' come closer to each other, at the same time as their z-dimension is reduced, as shown. The attenuation of the B'-layers between the A'-segments sets a limit to how low the yield point of B' can be compared to the yield point of A'.

Figure 5:
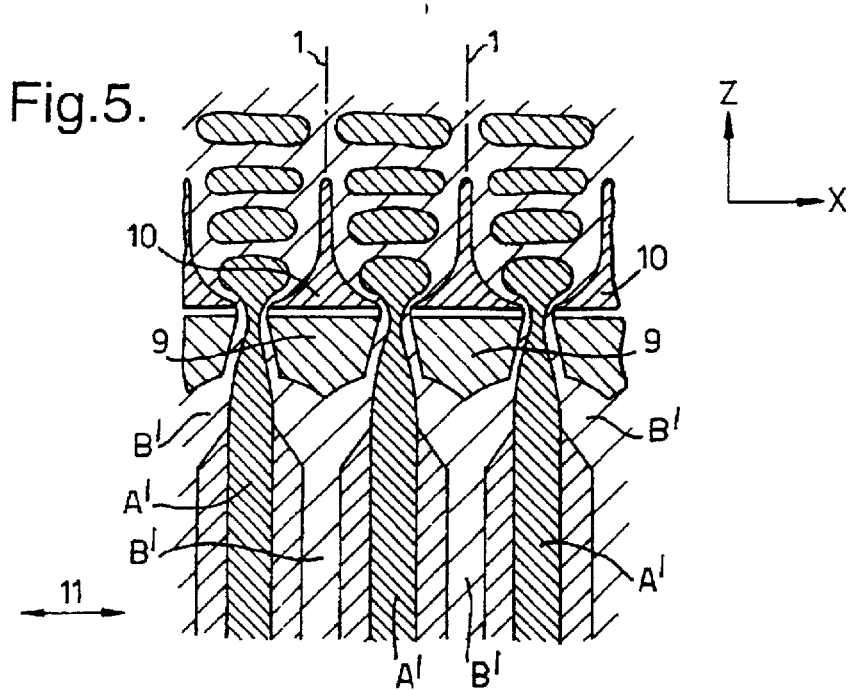
FIG. 5 shows in x-z section an alternative method of modelling B' around A', in which B' first is coextruded with A' to a conjugent B'-A'-B' flow stream, and the modelling mainly is mechanical.

In the arrangement of the channels and flows which is shown in FIG. 5, the components A' and B' are coextruded to a conjugent B'A'B' flow prior to the dividing (cutting). In this manner component B' will cover or "lubricate" the edges of the dividing members before the dividing of A' begins—as indicated in the drawing—and therefore the risk of A' adhering to the dividing members (10) is essentially reduced.

In order to get the conjugent B'A'B' flows extruded straight from the internal orifices defined by the members (9)

into the channels defined by the dividing members (10), the dimensions in the row of members (9) and those in the row of dividing members (10) must be adequately adapted to each other, and furthermore the delivery of components A' and B' must be coordinated with the reciprocations (11) so that the row of members (9) stand still, at least in essence, while A' and B' are delivered in pulsations, and the flow of A' and B' are stopped while this row moves. Similarly is true for the arrangements illustrated by FIGS. 6a+b and 7a+b+c, which will be described below, while there need not be similar adaptions for the arrangement illustrated by FIG. 4.

Figure 6A:
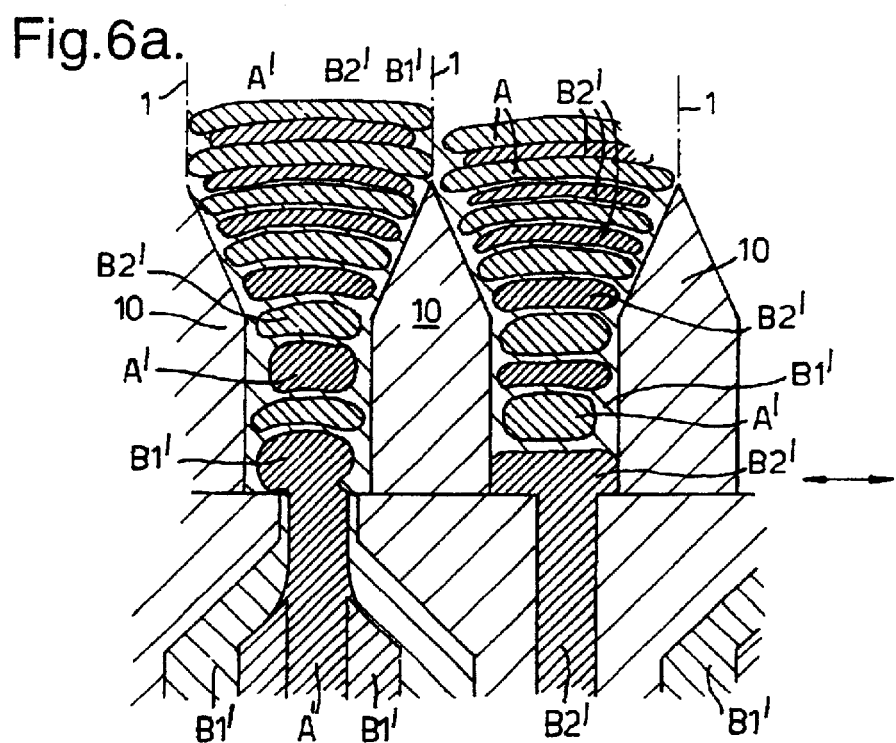
FIGS. 6a and b show, in x-z and y-z sections, respectively, a combination of the methods shown in FIGS. 4 and 5, by which the modelling can be purely mechanical.
Figure 6B:
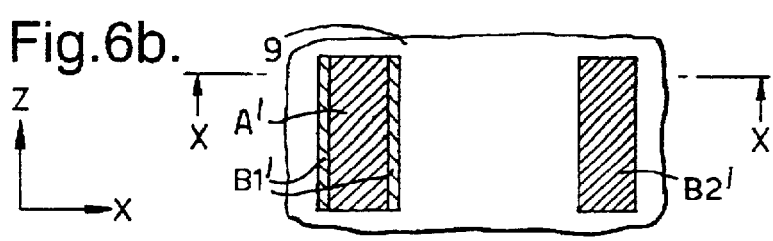

The arrangement of channels and flows, which is shown in FIGS. 6a and b represents a combination of FIG. 4 and FIG. 5. (In this connection it is immaterial that the dividing members are shown without knife-formed edges, this is just done to illustrate that the knife-form normally is not mandatory, (although preferable). It will appear from FIGS. 6a and b without any further explanation, that this arrangement, so to say in mechanical way, leads to a modelling of B1' and B2', taken as a whole, around each segment of A'.

As B' is coextruded on each side of A' to a conjugent B1' A' B$^1$ flow prior to the dividing, it may furthermore be coextruded on each side of B2' to a conjugent B1' B2' B1' flow. In that case the boundary cell walls (2) will consist of plain B1 as shown in FIG. 1a. Otherwise these boundary cell walls will consist of a combination of B1 and B2 as it appears from FIG. 6a.

The use of two B'-components B1' and B2' as shown in the FIGS. 6a+b presents a solution to a technical dilemma which inherently exists if there is only one B'-component, namely that on one hand A' can most straightly be formed into regular "cells" if the B' component is essentially more fluid than A' (has a lower compressional yield point), but on the other hand the B'-component then tends to be pressed out towards the walls of the dividing members (10). This tendency was already mentioned in connection with FIG. 4. Now with two B'-components, B2' can be chosen to have the same or nearly the same yield point as A', while B1' has a lower yield point (or may be a fluid). The choice of different yield points for B1' and B2' can be matter of selecting different compositions, or it may simply be a matter of using different extrusion temperatures for these two components. There is hereby mainly relied on part-freezing and/or part-precipitation of one or more constituents in the B'-component like in ice-cream—see the examples.

If the compositions of B1' and B2' are chosen so that B2 in the final product exhibits a higher yield point than B1, there can be obtained the product advantages which are explained in connection with FIGS. 1a+b. However, the apparatus represented by FIGS. 6a and b can also be used in cases when B2' and B1' are identical in all respects, also with respect to their temperatures during the extrusion.

Still with reference to FIGS. 6a+b, it has been mentioned above that the yield point of B1' ought to be essentially lower than that of A'. However, again there is a limit to how much more fluid B1' can be made without causing disturbances in the structure, since B1' becomes very unevenly distributed over the width of each of the internal orifices (12) if extruded in relatively small amounts, and if at the same time there are big differences in the apparent viscosities. This phenomenon is well known in all kind of coextrusion.

Figure 7A:
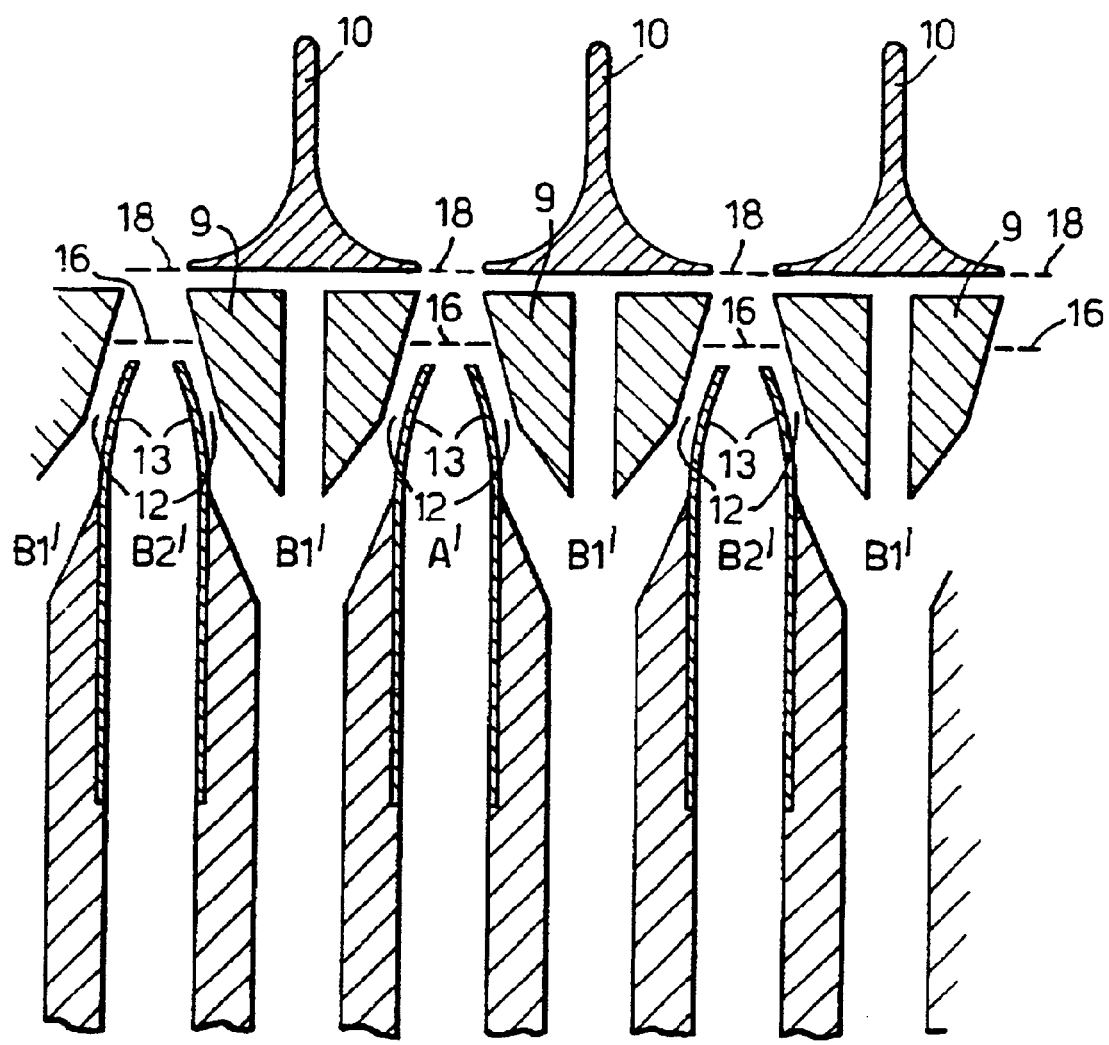
FIGS. 7a and b illustrate, in x-z section and y-z section, respectively, a modification of the coextrusion arrangement for formation of conjugent B'-A'-B' streams, which modification allows the yield point of component B' to be essentially lower than that of component A'. At the same time the sketches show how the "cell walls" of B-component in x-z planes can be formed.

However, according to the invention this problem can be solved, as shown in FIG. 7a, by the use of springy membranes (13), which close the internal orifices (12) for B1 towards the walls of channels for A' unless the pressure in B1' is conveniently higher than the pressure in A', and which secure that A' never flows into the channels for B1' (and similarly for the coextrusion of B1' with B2'). This system is operated in the way that B1' is injected into A' in pulses shorter than each pulse for extrusion of A, and at a conveniently high pressure. B1' will then primarily form "pockets" in A', but these "pockets" will become evened out during the further flow. (Similar applies to the B1' B2' B1' coextrusion).

The effects of injecting B1' into A' and B2' as here explained while using a B1' component of relatively low yield point and low apparent viscosity, are as follows:

1) Particularly straight dividing (cutting) of the A' and B2' segments
2) Reduced tendency to distortion of the segments during the passage through the exit part of the extrusion die, and
3) A lower back pressure and therefore possibilities of higher throughput.

These important effects are all due to the lubrication with B1' component on the different chamber walls. It is noted that in this arrangement of the "modelling", A' and B2' should exhibit generally equal yield points, otherwise B1' may coextrude only with the one which exhibits the lowest yield point.

The function of the springy membranes may be taken to the extreme so that they lock the passage of A', whereby each flow of A' becomes interrupted by a segment of B1' already at the position (12), i.e. without use of the reciprocating, dividing action. In that case the exit part (44) can be made in one part with (9), or if only one segmental stream or several separate segmental streams are wanted, the "exit part" may simply be omitted, so that (9) will be the end of the extrusion device.

Figure 7C:
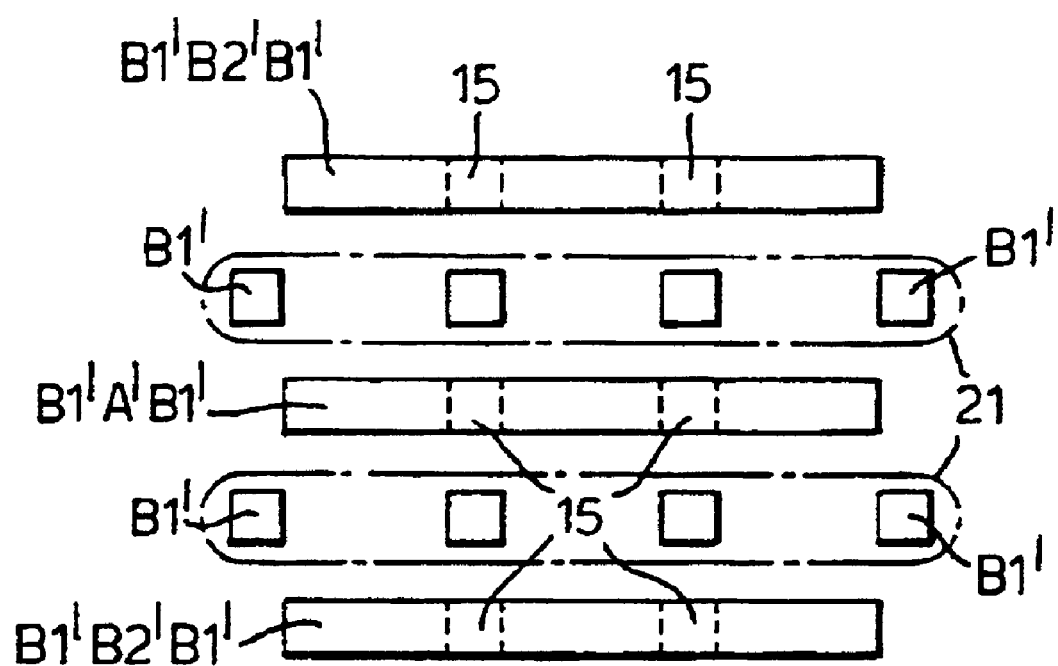
FIG. 7c corresponds to FIGS. 7a and b and shows the internal orifices as seen when the exit part is removed. It is drawn in a x-y plane.

FIGS. 7a, b+c further serve to show how to form the bridging B cell walls which extend generally in the xz plane—indicated by (5) in FIG. 1b Right at the end of the internal orifices for the B1' A' B1' and B1' B2' B1' flows there are ribs which are seen in profile as (14) in FIG. 7b, and seen towards their downstream ends as (15) in FIG. 7c, while their upstream edges are shown as the dotted line (16) in FIG. 7a. As FIG. 7b indicates, these ribs are not sharp edged but plane in the downstream end. Corresponding hereto there are ribs in the exit part (44), shown in profile as (17) in FIG. 7b. These ribs are sharp in both ends, the sharp edges being shown as dotted lines (18) and (19) in FIG. 7a. It will be explained below how these ribs in the row of internal orifices and in the exit part serve to shape bridging B1 cell wails inside the product. Similarly, the "ridges" (20) at the ends of the internal orifices and corresponding "valleys" (21) at the entrance to the exit part (see FIG. 7b) serve to form layers of B1 on both surfaces of the final product.

While each channel for B1' branches out to feed into an A' channel on one side and into a B2' channel on the other side, it also proceeds straight forward to feed directly into the exit part ending in 4 slots (21 in FIG. 7c) the length of which in x-dimension corresponds to each opening into the exit part, while the position in y-level corresponds to the levels of ribs (17) or "valleys" (21), as the case may be.

When the reciprocating movement is stopped in the position where the B1' component is fed directly, into each chamber in the exit part, while the internal orifices for the B1'-A'-B1' flows and the B1'-B2'-B1' flows are blocked by the dividing members (10), the "valleys" will become filled with B1' component, and similarly the upstream part of the ribs (17) will become fully covered with B1'. After the following step of reciprocation, a B1'-A'-B1'- flow or a B1'-B2'-B1'-flow (as the case may be) will be fed into the chambers in the exit part (the internal orifices for direct B1' extrusion being blocked), but due to the geometry of ribs (14) and (17) and "ridges"/"valleys" (20) and (21) these flows will never get in contact, either with ribs (17) or with the xz surfaces of the chambers in the exit part. These ribs and chamber surfaces will all the time be covered with B1' and will therefore create "bridging cell walls" of B1' in the final product.

By making adjacent dividing members (10) and/or adjacent ribs (17) of mutually different lengths, and at the same time suitably adjusting the length into which the flows are cut, it is possible to make the segments of A' rotate and acquire a generally cylindrical or spherical shape.

FIGS. 7a, b+c show the most complicated but usually also best method of treating the flows. However, the individual features which are presented here can of course be used in other combinations. Thus the use of springy membranes (13) and of ribs etc. are two different features which are not necessarily combined. And further the coextrusion of B1' into the B2' flow which requires that A' and B2' have practically equal yield points—and the direct extrusion of B1' into the channels in the exit part may both be omitted. In that case there should not be any ribs (14) and ridges (20) in the B2' channels, and therefore it will become B2' which covers the ribs (17) and the xz surfaces of the chambers in the exit part.

Finally, FIG. 7b shows the transport belt (23) which takes up the extruded product, and on which there normally are carried out further operations. It also shows a flab (23) which should be adjustable. This is not mandatory but can be a help for adjustment of the back-pressure in the exit part to avoid on one hand the occurrence of cavities in the extruded product, and failing flowing together of the segmental streams in the exit part (44), and on the other hand an exaggerated pressing flat of the segments of A' components.

By modification of the dividing members (10) shown in FIGS. 7a+b, the apparatus can be made to produce the structure represented by FIG. 1c. For this purpose the upstream edges on (10) should still be straight and generally perpendicular to the plane defined by the array of flows, but after the dividing, the different "levels" of segmental flows should gradually become staggered ("level" meaning this space between two adjacent ribs (17) or a "valley" (21) and the adjacent rib (17)). The downstream edge of each dividing member (10) must have a staggered shape corresponding to that wanted in the product, and the sidewalls of (10) will gradually adapt to this shape. Normally the staggering of the construction should not extend over the full x-dimension of the apparatus and the product, but should be zero at the sides of the apparatus and at the x-boundaries of the product.

FIGS. 7a+b can also illustrate the manufacture of a product having two different series of "cells", A1 and A2, and only one component B for the "cell walls", in other words the designations A', B1' and B2' in the drawings should be substituted by A1', $B^1$ and A2', respectively. However in that case each of the internal orifices for B in the row of orifices shown in FIG. 8c should not be interrupted as in this drawing. One of the two A components may e.g. be waterbased and the other one fat/oil based, while B in the final product normally should be a gelled composition.

Figure 8A:
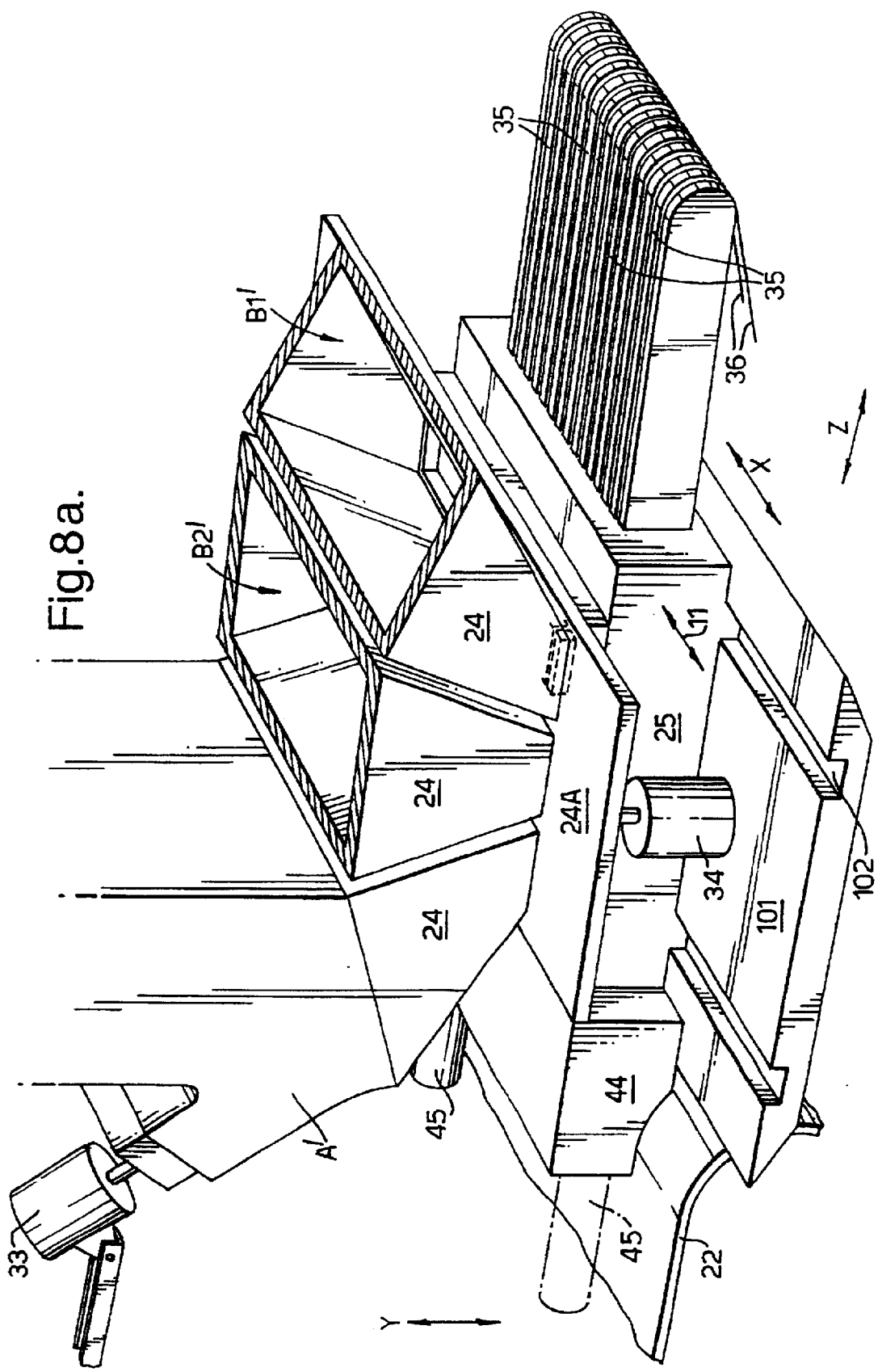
FIGS. 8a, b and c show, in perspective presentation, x-z section, and y-z section, respectively, a flat coextrusion die suited for manufacturing the product shown in FIGS. 1a and b, and in which the extrusion of each component is a pulsating ram extrusion coordinated with the movements which transversely divide the flows. 8b is enlarged with respect to 8a and c by about two times.

The total coextrusion die represented by FIGS. 8a, b+c, consists of a stationary inlet part (24), a reciprocating "interpositioning part" (25) with chambers for the interposed narrow flows defined by walls (26) and ending in the array of internal orifices defined by elements (9), and a fixed exit part supplied with dividing members (10). The "interpositioning part" (25) is guided by tracks 102 in the fixed base plate 101. The reciprocation is indicated by the double arrow (11) but the means for this reciprocation are now shown. The apparatus is normally installed in such way that the section shown in FIG. 8b is really horizontal or close to horizontal. The three components A' (for "cells") $B^{1'}$ and $B^{2'}$, (both for "cell walls") are extruded from the inlet part (24) through 3 relatively long and narrow orifices (27 for A', 28 for B2' and 29 for B1') by conventional means, i.e. by pumping or extrusion. The apparatus for this are not shown. The inlet part (24) is outside the section shown in FIG. 8b, but the position of the walls for the A'-chamber, the B2'-chamber and the B1'-chamber in this part are indicated by the dotted lines (30), (30a) (31), (31a), and (32a), respectively. Prior to or in connection with the conventional pumping or extrusion, each of the components is intimately blended and given the appropriate plastic condition, normally by semi-melting or semi-solidification (the latter as in the manufacture of ice-cream). Since the rheological properties in such semi-molten or semi-solidified state may depend very critically on the temperature, temperature-control may not be sufficient but a constant measurement of the apparent viscosity may be needed for feed-back control.

The temperatures in each of the 3 components—which may be different temperatures—are maintained during the passage through (24) by a circulating heating/cooling liquid. The system for this is not shown. Similarly, there is kept appropriate temperatures in the reciprocating part (25) and in the exit part, the heating/cooling means for which are not shown.

The flow of components through each of the 3 exits from the stationary feeding part (24) is not constant, but is made intermittent by means of a pressure varying device, e.g. hydraulic cylinder (33) connected to each flow (but only one is shown in the drawing). For each component the minimum pressure is close to zero, while the maximum pressure may be several hundred bars. There is a steady measurement of pressure in each component with feedback to the pump/extruder so as to secure that the maximum pressure becomes almost the same in each stroke. (Devices not shown). The pressure is raised while the chambers in part (25) become filled. During that period the reciprocation of (25) is stopped, and two clamps (e.g. hydraulic clamps) of which one is shown as (34) in FIG. 8a, secure a tight sealing between the 3 exit slots of part (24) and corresponding rows of openings in the inlet plate (24a) on part (25). After reduction of the pressures in the 3 components almost to zero, the sealing between parts (24) and (25) is released—clamps (34) should only move a fraction of a mm to achieve this—and the "modelling" processes, including the reciprocations of (25), are started. These processes are further described below. Later on the firm sealing is again established and pressure applied to feed the channels in (25).

In the reciprocating "interpositioning" part (25) there is a number of narrow channels for A', B1' and B2', respectively. In FIG. 8b it is written in each channel which component it conducts.

Figure 8C:
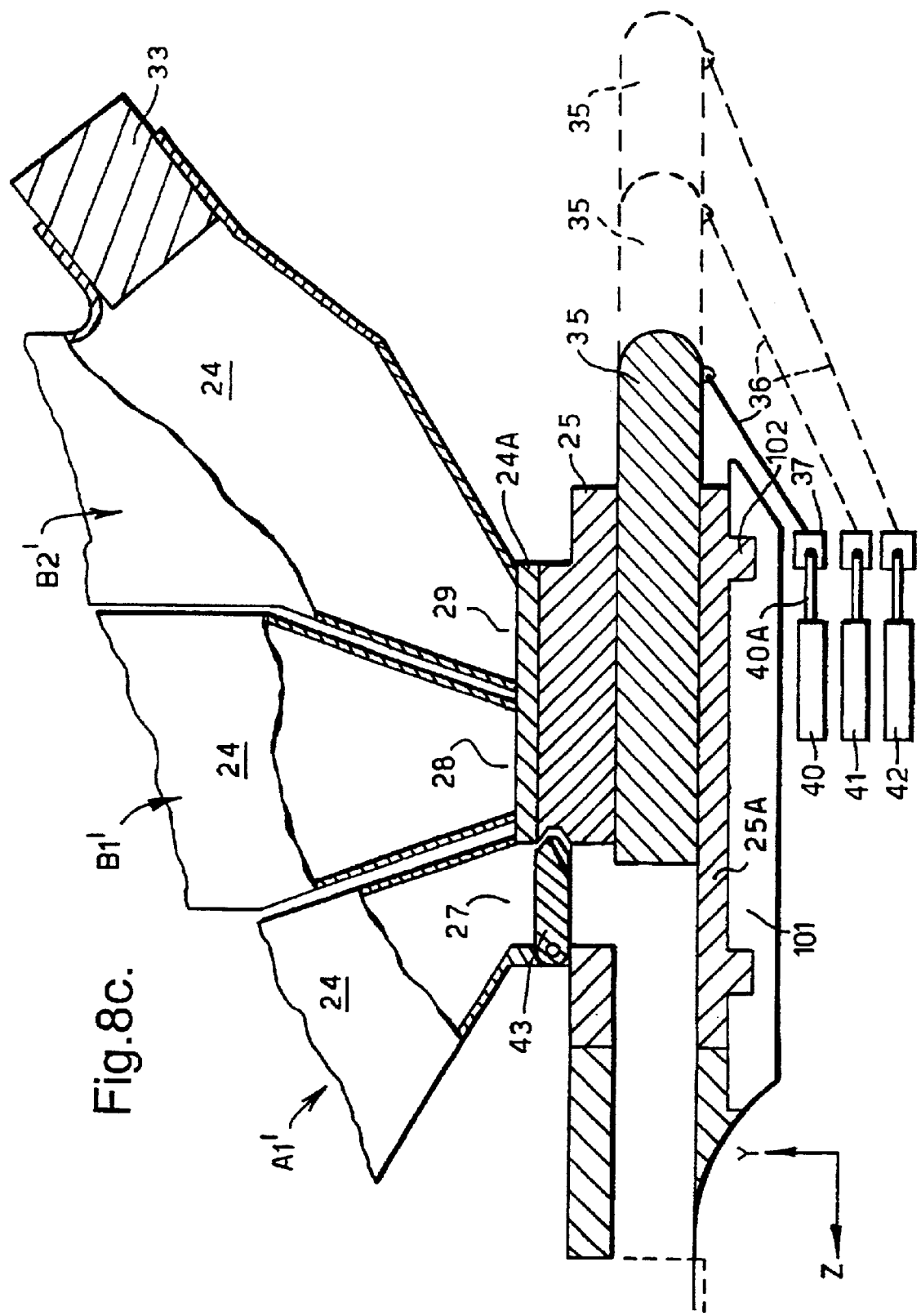
FIG. 8d shows, in perspective view with the parts moved from each other, a modification to FIGS. 8a, b and c by which the pulsations in each flow are established by means of a multi-valve which opens and closes in coordination with the movements which transversely divide the streams.

These are closed channels, except at their exit end and except for the above mentioned rows of openings in the inlet plate (24a) towards the corresponding orifices in the fixed inlet part (24). Thus, since FIG. 8c shows a section which goes through one of the A'-channels in the reciprocating part, it shows this channel opening towards the A'-channel in feed-part (24), while it does not open towards the B1' and B2' channels in the feed-part.

Oppositely to the exit, each channel in the reciprocating "interpositioning part" is closed by a ram (35) moved forward through a wire (36) and backward by means of the pressure in the extruded component while the channel is filled from (24). The function is further described below. All rams for A1' are synchronised by fixing the wire which drive them forward to one and the same connecting bar (37), driven by actuator (40) through connectioning rod (40a)— the arrangement is presented very schematically in FIG. 8c without showing guiding tracks for (37). Similarly, all rams for the B2'-flows, except the B2'-flows closest to the sides of the coextrusion device, are all fixed to one connecting bar and driven by actuator (41), through connecting rod (41a), while all rams for the B1'-flows except those closest to the sides of the device, are all fixed to connecting bar (39) and driven by actuator (42) through connecting rod (42a). Normally there will be more than the 3 A'-flows, 4 B2'-flows and 8 B1'-flows, which are shown in these drawings. For reasons which will appear from the explanations in connection with FIG. 12, the mentioned 4 rams at the sides of the device are each driven separately by individual actuators.

The actuators (40), (41) and (42) are conveniently but not necessarily operating hydraulically. The coextrusion and "modelling" processes take place as explained in connection with FIGS. 7a, b+c. Preferably, the ram extrusion is not established by steady reciprocations of the rams, but in a series of pulses forward (e.g. 5–20 pulses) with (25) changing its position between each pulse, each series followed by one movement of each ram backward to its starting position, while the chambers again are filled from (24). This is explained in detail in connection with FIG. 12.

During each "kick" (or pulse) on a ram the pressure may exceed 100 bars, and each "kick", including the time to "cut" the flows and bring the "interpositioning part" (25) into the next position ready for a new "kick" should preferably last less than 0.1 sec.

At each of the 3 entrances to the channels in the reciprocating part (25), i.e. immediately following the exits (27), (28) and (29) in the feeding part (24), there is installed a non-return valve (43), shown in cross-section in FIG. 8c. Seen in x-direction these 3 valves extend in the full length of the exits (27), (28) and (29). They prevent any substantial loss of material by backflow which otherwise would occur when the cylinders (34) partly have eliminated the sealing between part (24) and part (25). Likewise, the sealing of the connection between the reciprocating "interpositioning part" (25) and the exit part (44) with the dividing members (10) must be firm while there is extruded through this connection and while the rams are moved backward during a filling period. However, this sealing must be much looser while (25) is in movement, otherwise the friction may become a problem. The hydraulic clamps (45) take care of the tightening and loosening of this sealing by movement amounting to only a fraction of mm. The abrupt reciprocating movements of (25) which are indicated by the double arrow (11)—can conveniently but not necessarily be established in fully mechanical way by means of a cam (not shown). This is further explained in connection with FIG. 12.

In addition to components A', B1' and B2' there is also, in smaller amounts, used a component C for lubrication of the rams. This is applied under pressure in conventional way, but the means for this are not shown. C must of course be conveniently compatible with the other components, i.e. it must not ruin the mechanical stability of the final product, and it must be suited for food applications (see the examples).

The conveyor belt (22) which already has been mentioned in connection with FIG. 7b, is preferably advanced abruptly with stops corresponding to the short periods (e.g. 0.5 sec.) while the channels in part (25) receive material from part (24).

At the position where the coextrusion device delivers the product to the conveyor belt, there may a knife for cutting the product into convenient lengths (not shown), and there may also be other devices in connection with the conveyor belt, e.g. for heat treatment of the product.

In many cases the packing of the product can take place on this conveyor belt, and to do so a packaging film can be laid on the belt before this receives the cut-out piece of product. This film can be automatically wrapped over each piece, and if the belt is accelerated for a short moment after each cutting action to separate the pieces from each other, the wrapping can be done from all 4 sides. If the packaging film is an aluminium film, this can sufficiently support the product during the solidification of the B'-component or—components (solidification by heating or simply by storage).

Coordinated with the cutting at the entrance to the conveyor belt, the extrusion of A-component may be interrupted for a short period, while there still is extruded B'-component or—components, so as to secure that the cuts traverse B' only. This is advantageous if A in the final product is fluid.

"Bleeding" of A component from the ends of the product pieces can alternatively be avoided by a conventional coating of the cut ends or of the entire product (e.g. with chocolate or similarly) preferably while the product is frozen.

It should be mentioned that the use of a conveyor belt is not always needed. Furthermore the hydraulic clamps (34) and (45) (or similar nonhydraulic clamps) and the non-return-valve (43) are not indispensable but are very useful for achieving a high throughput.

Figure 9:
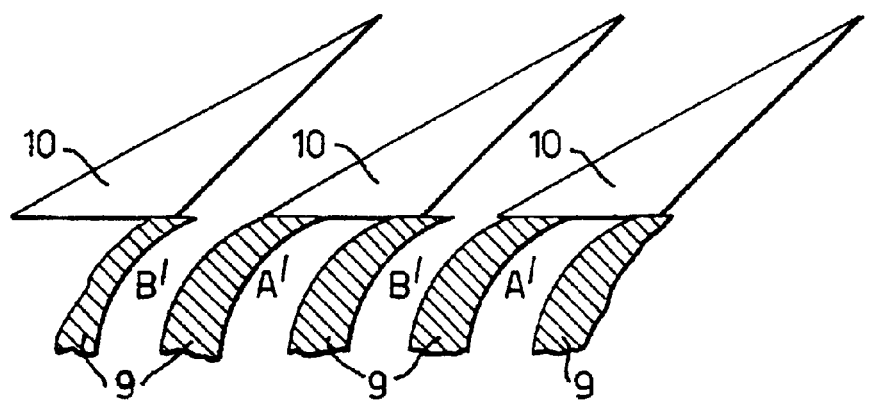
FIG. 9 shows in x-z section another modification of the apparatus of FIGS. 8a and b, namely a modification in the array of internal orifices and row of dividing members, by which there is obtained a true severing action for dividing the flows.

Instead of establishing the pulsating extrusion by means of rams, it can also be done under use of a valve arrangement as shown in FIG. 9. Between the fixed inlet part (24) and the reciprocating "interpositioning part" (25) there is inserted a shutterplate (46), which also follows the movements of (25) indicated by the double arrow (11), but superposed on this movement, (46) is driven forward and backward relative to (25)—see double arrow (47)—by means of an actuator fixed to (25) (not shown). In firm connection with (25) there is a coverplate (48). Both shutterplate (46) and coverplate (48) have 3 rows of slots, (49) for the A'-component, (50) for the B2'-component, and (51) for the B1'-component. These slots in (48) correspond exactly to the respective channels in (25), and the slots in (46) exactly match those in (48) when the shutter stands in position "open", while the shutterplate completely covers the slots in (48) in position "closed". Before this shutter arrangement there is not installed any devices to produce pulsations in the extrusion pressure. This system is mechanically simpler than the ram extrusion, however due to frictional problems it is slower.

If one shutterplate is used for all 3 components, they will of course be extruded in the same rhythm, but it is also possible to use one shutterplate for each component.

By means of the modification shown in FIG. 9, the dividing of the flows will take place by a very efficient "severing action" and it will even be possible to divide flows which contain fibres longer than, say 2 mm. Since the channels in the exit part are biased, seen in relation to the z-direction of the apparatus, the take-off of the product from the device by means of a conveyor belt must similarly be biased.

The drawing represents a modification of the simple "modelling" shown in FIG. 4, but this type of "severing action" can also be applied to the more complicated methods of "modelling", even to the method shown in FIGS. 7a, b+c.

Figure 10:
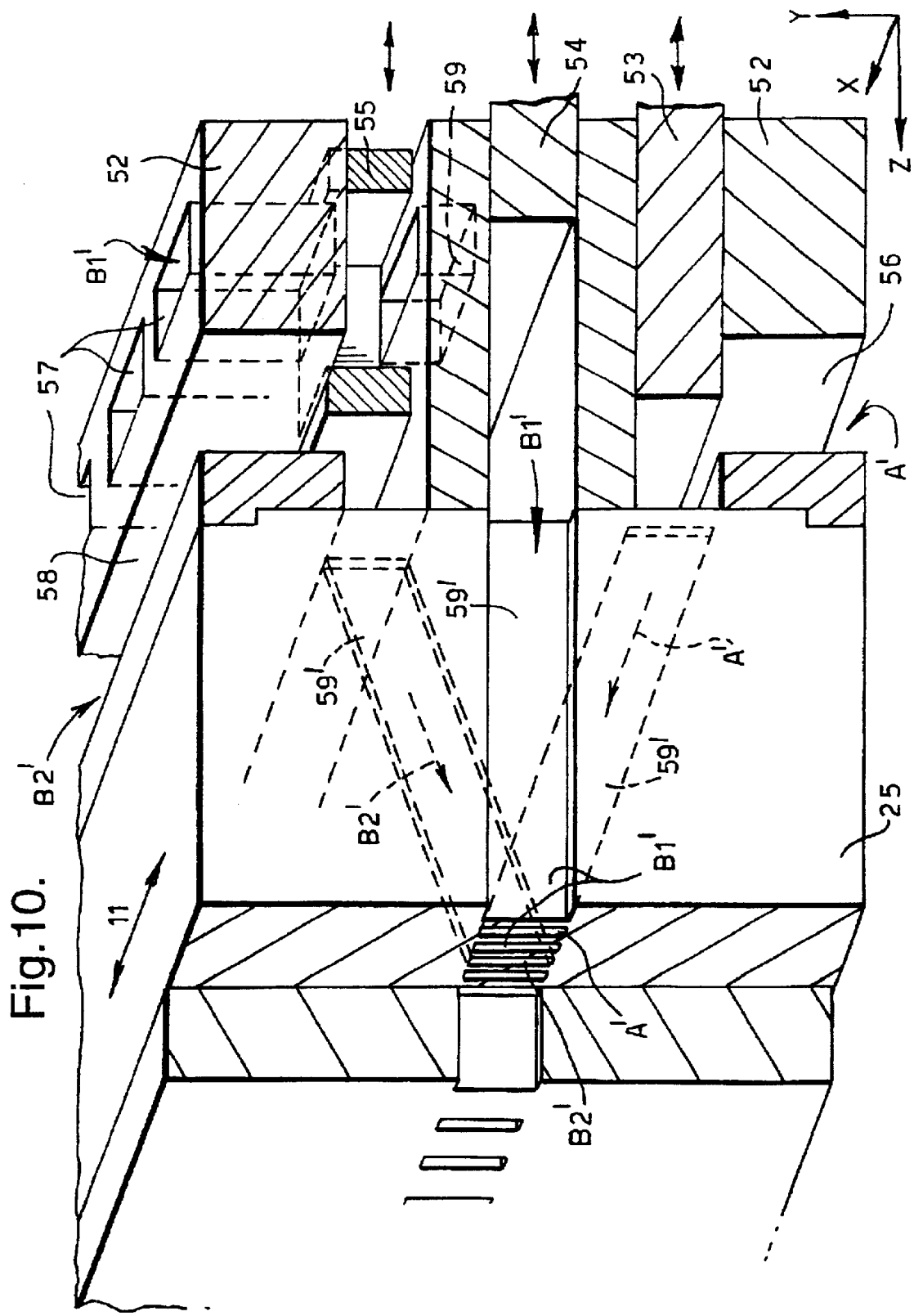
FIG. 10 shows, perspectively and in partial sections, an embodiment of the methods and apparatus according to the invention, in which the arrangements of transverse movements and ram-extrusion are essentially different from what is shown in FIGS. 8a, b and c, but suitable for producing similar products. The drawing does not show the entire extrusion device.

In the embodiment represented by FIG. 10, there is a separate "ram-part" (52) for the ram extrusion, and in this part there is one ram only for each component A', B1' and B2', namely rams (53), (54) and (55) respectively. This "ram-part" is a fixed part like the "feed-part" (24), and the feeding takes place through slots (56) for A', (57) for B1' and (58) for B2'. In order to allow the passage of B1' into the middle chamber of the "ram-part", the ram (55) is also supplied with a slot (59) of with a row of slots.

The "feed-part" (24), which is not shown here, comprises hydraulic pressure varying devices and no-return valves like (33) and (27) in FIGS. 8a+b, but since the "ram-part" (52) does not move, there is no hydraulic clamp like (34).

The reciprocating "interpositioning part" (25)—reciprocations indicated by double arrow (11)—which slide upon the "ram-part" (52) intersperse the 3 components and bring them into array by means of the converging channels (59').

The drawing ends where the flows have been brought into array, but in actual fact this embodiment also comprises devices for the dividing and "modelling" of the flows, and the "interpositioning part" (25) may e.g. end in constructions as shown in FIGS. 4, 5, 6a+b, or 7a, b+c, while at the very end of the coextrusion device there can be an "exit part" (44) with "dividing members" (10) as shown in the other drawings. There can also be a conveyor belt to receive the extruded product.

Furthermore there can be one or more hydraulic clamps like (45) in FIGS. 8a and b. In this embodiment of the invention, they serve to seal off and loosen not only the connection between the "interpositioning part" (25) and the "exit part", but also the connection between the "ram-part" (52) and the "interpositioning part".

In other respect, this embodiment of the invention is normally generally similar to what is shown in FIGS. 8a, b+c and explained in connection with these drawings.

The apparatus of FIGS. 11a+b consists of an "inlet part" (not shown, but constructed as explained in connection with FIG. 10) a fixed "ram-part" with 4 rams, (53) for A', (55) for B2' and two (54) for B1'. There is no horizontally reciprocating "interspersion part", but the "ram part" is immediately followed by the "exit part" with the dividing members (10). In this embodiment of the invention, the exit part is not stationary, but reciprocates up and down in a pivoting movement, as indicated by the double arrow (11), around the axis (60). This axis goes through the level on the conveyor belt (22) where the product is delivered. It is clear that if the exit part would be allowed horizontal movements the product would be torn (unless the conveyor belt would be similarly moved, and that would be very unpractical), but the pivoting movements which appear from these drawings will not damage the product in this way, provided the amplitude is sufficiently low and/or the exit part is sufficiently long.

The "modelling" process is generally similar to what is shown in FIGS. 7a, b+c, but note that the x-direction is generally vertical and the y-direction generally horizontal. Other differences between the features shown here and those shown in FIGS. 7a, b+c are a) Only one A'-flow, two B1'-flows and two B2'-flows. (There could be a few more).

b) 9 instead of only 2 sets of ribs (14) and (17), now to form vertical "cell walls". (This number can of course be varied).

c) B1' forming a conjugent flow with A' only and not being directly passed into the exit part. (This is not essential for the embodiment).

Like in the other embodiments of the invention there are clamps (45) i.e. hydraulic clamps (45) adapted to firmly press the exit part towards the preceding part when efficient sealing is needed, and loosen the connection during the periods of relative movement between the parts.

The structure shown in FIG. 1d can be produced with this embodiment of the apparatus of the invention, when suitably modified. The ribs (17) in the exit part (44) should not point straight in the machine direction, but in the "upper level" e.g. point to the right and in the "lower level" to the left. This leads to the formation of two mutually displaced rows of cells. To achieve three mutually displaced rows as shown in FIG. 1d the exit part must have three inlets instead is of only the two which are shown. Near the left and right edges of the extruded product the displacements should be near zero.

The following will explain in detail the programme for operating the coextrusion and "modelling" process, when the apparatus shown in FIGS. 8a, b and c is used. FIG. 12 shows the different stop-positions of the reciprocating "interpositioning part" (25) relative to the fixed "exit part" (44). There are 4 such stop positions, namely:

Position I, in which the upstream ends of the dividing members (10) cover the entire row of internal orifices defined by the members (9), so each of the 3 sets of flows (B1' A' B1'), B1' and (B1' B2' B1'), respectively, are stopped, and any retraction of material from the channels in the exit parts also is prevented, provided there has been established a firm sealing between the two apparatus parts (25) and (44) as achieved by means of the hydraulic clamps (45).

Position II, the symmetrical position, in which there is free passage for all plein B1' flows into the exit part (44) and is shutoff for all of the (B1' A' B1') and (B1' B2' B') flows, still provided a firm sealing has been established.

Position III, the position in which part (25) is most to the left, and in which there is free passage into the exit part (44) for all conjugate flows (B1' A' B1') and (B1' B2' B1') except the farthest right (B1' B2' B1')-flow (which therefore must not be acted on by a ram), and is shut-off for all plain B1'-flows, still provided a firm sealing has been established.

Position IV, the position in which part (25) is most to the right, and in which there is free passage into the exit part (44) for all conjugent flows (B1' A1' B1') and (B1' B2' B1') except the farthest lefti (B1' B2' B1')-flows (which therefore must not be acted on by a ram), and is shut-off for all plain B1-flows, still provided a firm sealing has been established.

If in any given chamber in exit part (44) the extrusion during stops in position III will inject a piece of a (B1' A' B1')-flow, then the extrusion during stops in position IV will inject a piece of a (B1' B2' B1')-flow in the same chamber (and vice versa).

Starting situation for the following program is a situation in which (25) has been brought into position I, hydraulic clams (45) and hydraulic clambs (34) both are under pressure to make firm sealing between the "inlet part" (24) and the "interpositioning part" (25), and between this part (25) and the exit part (44), and furthermore each of the rams (35) are in their foremost position, while the pressure in the inlet part (24) is close to zero in each of the 3 components, as regulated by the hydraulic pressure variating devices (33).

1st sequence of steps: The pressure in the inlet part (24) is increased in each of the components by means of the devices (33) so as to inject each of the components into the channels of part (25) and drive each of the rams (35) to its most backward position. If the rams are adapted to be positively pulled backward (which they are not in the construction shown in FIGS. 8a and c), this pull should also be activated but should be stopped when the farthest back position has been reached. After this devices (33) bring down the pressure of each component in the inlet part almost to zero, then the hydraulic clamps (34) and (45) release the two sealing pressures to allow part (25) to be moved, whereafter (25) is moved to position II. Finally clamp (45) is activated to establish a firm sealing between part (25) and part (44) (but clamp (34) is not activated).

2nd sequence of steps: All rams for extrusion of B1' are pushed one step forward by means of the actuators (42), after which the sealing between part (25) and part (44) is released, (25) moved to position III and a firm sealing again established between part (25) and part (44).

3rd sequence of steps: All rams for B1' except the one or farthest left one are pushed one step forward at a particularly high velocity to inject B1' evenly unto the A' and B2' flows. Then all rams for A' and B2', except the one farthest or the left B2' ram are pushed one step forward, after which the sealing between part (25) and part (44) is released, (25) moved to position II, and a firm sealing again established between part (25) and part (44).

4th sequence of steps: Identical with the 2nd sequence, except that towards the end of this sequence the movement of (25) goes to position IV.

5th sequence of steps: Identical with the 3rd sequence, except that it is the farthest right B1' and B2' rams which are not activated.

The 2nd to 5th sequences of steps are repeated, e.g. 4–9 times. However at the very end of this procedure, part (25) is not moved to position II but to position I, after which a firm sealing is established not only between (25) and (44) but also between the "inlet part" (24) and (25). Now the total sequence of steps is finalised—it should preferably take no more than about 1 second—the channels in (25) become refilled and all continues as described above, starting with the "1st sequence of steps".

The above programme concerns the most complicated but generally most advantageous "modelling" process, in which B1' is coextruded with both other components prior to the dividing, and also goes directly to the exit part (44) through a separate set of orifices. If as an example, there are only 2 sets of flows extruded out of part (25), namely a conjugent B1' A' B1' flow and a plain B2' flow, then the positions shown in FIG. 12 will be substituted by 3 positions only, position II being omitted (and position I will conveniently be a symmetrical position). On basis of the principles which appear from the above programme, it will be easy to set up analogous programmes for the different processes by which the "modelling" can be carried out.

It has already been mentioned that the change between the different position of part (25), also referred to as the reciprocations, and indicated by arrow (11), most conveniently is carried out purely mechanically by means of a rotating cam (although other methods of course also can be applied). Then one revolution of the cam shaft should preferably correspond to the total sequence of steps, from the start of filling the channels in (25) until the apparatus again is ready to make a new start of filling. The mechanical movement of the cam can conveniently also determine when the other operations are started, while electronic timers or registrations of actuator positions conveniently determine when these other operations are stopped. The actuators for the rams are preferably either hydraulic or are step-motors in connection with spindles, while the clamps, referred to as being hydraulic, also e.g. can be fully mechanical.

In many cases it will be possible to avoid the use of non-return valves (43), however this will make the production slower.

With reference to FIG. 8b and FIG. 12 the width of each channel in (25) prior—to the merging of B1' with A' and B2' at the end of this diepart—can as a suitable example be 2 mm and the width of the channel walls (26) 1 mm. This means that the distance between adjacent dividing members (10) as measured between their downstream edges will be 2+1+2+1=6 mm. Further more in this example the width of each orifice (9) in part (25) can conveniently equal the distance between adjacent upstream edges of the dividing members (10) and be 1 mm. On each of the dividing members, the surface which gives the member shutter effect will consequently cover 5 mm in the x-direction.

It has been mentioned that the methods according to the invention also can be applied to circular extension. In that case the embodiment shown in FIG. 10, but modified for rotation, is most suited. The material can leave the extrusion device as segments of the circle and then be conveyed by belts on their two major surfaces.

FIG. 12 part (25) may still be reciprocated, but is preferably rotated one way only, with stops in the 4 positions I, II, III and VI. This does not mean that the motor or other heavy driving means have to stop since the drice may be established through a sliding or spring coupling, while the short stops of rotation of (25) are established by the hydraulic clamps (45) and additionally further brake devices.

Although the extrusion methods and apparatus of the invention primarily have been developed with a view to coextrusion of cellular foodstructures the "modelling" of B' around A' by a suitable coordination of extrusion in pulses and relative movements of dieparts, can find other important uses in connection with extrusion of cell-formed polymer products or ceramic products. In such cases the nesting of A in B normally should only be in two dimensions, in other words A should extend from one major surface of the product to the other major surface. The cell structure may serve decorative purposes, when A and B have different optical properties, or if A can be fully or partly removed after the extrusion. A can e.g. be paste which can be leached out. The cell structure may also have a real technical function, e.g. in the manufacture of catalyst products, where A can be a porous material e.g. ceramic material containing the catalyst, and B, e.g. also ceramical, can act as reinforcement in all 3 dimensions.

As mentioned in the introduction to this specification there does not, to the knowledge of the inventor, exist any official standard for measurement of compressive yield point. Neither does there exist any commercial equipment for such measurements, when the sample to be tested is only about 1 or a few grams as needed in practice for the measurements on a stack of B "cell-walls" cut out the final product of the invention. It was therefore necessary to construct a test device and decide on the conditions of testing.

Figure 13:
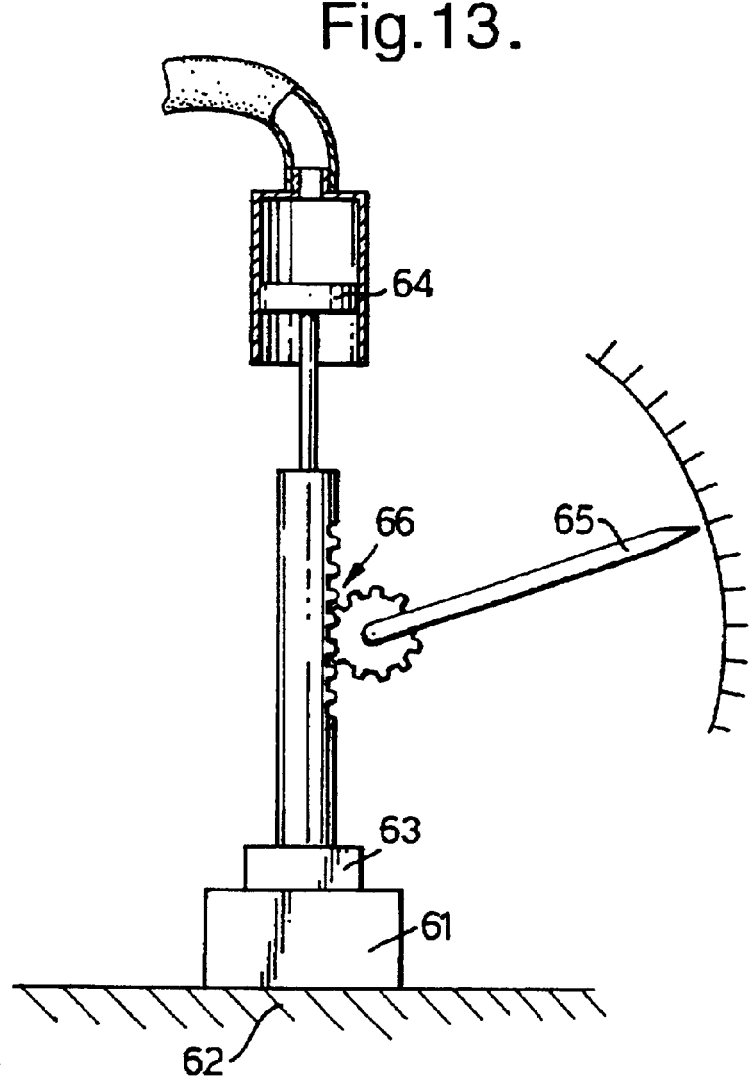
FIG. 13 represents the test apparatus for determination of compressional yield points.

FIG. 13 shows the device. The sample (61) is placed on a metal base (62) which is supplied with cooling/heating and temperature controlling means for the testing of semi-frozen or semi-molten A' and B' components. The device has a square foot (63) (dimensions see below) and is pressed into the sample by means of a piston operated by air, the pressure of which can be exactly adjusted to give a well defined and variable pressure on the sample. The penetration of the foot (63) into the sample is shown by the indicator (65) which is driven by rack and pinion (66). The indicator is here shown in simple way, but is preferably a pen to write compression/time diagrams.

When the apparatus is used to test semi-frozen or semi-molten material, the foot (63) is first pressed down in the base (62) for a long time enough to give it the adjusted temperature, and the semi-frozen or semi-molten samples are taken out from the blending apparatus, and very quickly cut in shape and tested.

When B cell-walls from the final product are tested, they are cut out as pieces which must be as plane as possible. These pieces are then stacked up to an assembly (61) in the right shape (see below) under use of a holder or "mould". Low pressure is applied to the foot (63) to make the stack compact without causing any flow, and the holder is opened and removed. The pressure is gradually increased until a permanent flow exceeding 10% compression per minute is observed. For exact measurements the testing has to be repeated several times after a first range finding test for the approximate value.

Size of the foot (63) and sample (61):

The foot is square shaped, and for measurement of yield values lower than 200 g cm$^{-2}$ it measures 20 mm×20 mm, for yield values between 200 to 10,000 g cm$^{-2}$ it measure 10 mm×10 mm, and for higher yield values 5 mm×5 mm.

The horizontal surfaces of the samples are also made square formed with the edge of the square double the measure of the foot, i.e. 40 mm, 20 mm and 10 mm, respectively.

The height of the sample is half its length and width, i.e. 20 mm, 10 mm and 5 mm, respectively.

The following examples illustrate the invention.

EXAMPLES

General Information Relating to the Examples

Equipment: A laboratory extrusion device generally similar to the apparatus shown in FIG. 10, however with feeding in the three chambers in the inlet part without any continuously operated pump or extruder—it is not necessary since the extrusion involves less than 1 kg of each component—but with an intermittently operated stamp as shown by (33) in FIGS. 8a and c. Joining of the flows: in all examples conjugent B1' A' B1' flows, but no coextrusion on the sides of the B2' flows, as shown in FIGS. 6a and b. Use of the membranes (13) shown in FIG. 7a, except in examples 2 and 5, where the yield point of B1' is lower than but relatively close to that of A'. (In the other examples the difference is much bigger).

Experiments in preparation of the examples: The purpose of these experiments is to choose in a simplified way the best yield point for each of the components A', B1' and B2'. For A' and B', clay with different contents of water was tried and for B1' doughs made from wheat flour with different contents of water. A number of combinations were tried.

The coextruded samples were dried with hot air, then sliced up with a razor blade, and magnified photos were taken (there had been added different pigments to the three components).

Chosen as the most suitable was:

A': clay with 26% contents of water, showing yield point 1.6 kg cm$^{-2}$ (20° C.).

B2': the same as A'.

B1': a dough of 1 weight part four to 1.5 weight parts water, showing yield point 25 g cm$^{-2}$ (20° C.).

It was therefore decided to aim at these yield points in each of the examples except in examples 1 and 2 where this is probably not possible.

Example 1

Component A: Marzipan

Component B1: Dark chocolate

Component B2: The same dark chocolate

Lubricant for the rams: sunflower oil.

It was found that the marzipan had yield point 400 g per sq. cm. To achieve the same yield point in the chocolate as wanted in the B2' component, it was found that its temperature should be 29.5° C. To achieve the yield point 25 g per sq. cm in the chocolate as wanted in the B1' component, it was found that the temperature should be 31° C.

Temperature for the extrusion apparatus: 35° C. Temperature for the marzipan at the entrance to the extrusion die chosen to be 20° C.

Yield point of the chocolate (A-component) at 20° C., as measured on a sample cut out from a plate of the chocolate, is 56 kg cm$^{-2}$.

Example 2

Components B1' and B2': powdered parmesan cheese. The yield point of the mass at 20° C. is measured to be 1.3 kg cm$^{-2}$.

Component A'; a dough adjusted by an admixture of bran to show approximately the same yield point, consisting of: 3 weightpart wheat gluten, 15 parts oat bran, 18 parts water, and small amounts of a baking powder.

Lubricant for the rams: egg white.

Extrusion at 20° C.

Aftertreatment: Heating to about 100° C. to melt the cheese and bake the dough, by which it also expands. Yield point of the solidified cheese at 20° C.:20 kg cm$^{-2}$.

Example 3

Component A'; honey, viscous fluid at 20° C. The preferable yield point for the extrusion, 1.6 kg cm$^{-2}$, was approximately obtained at −15° C. which therefore is the chosen extrusion temperature for this component.

Components B1' and B2': Identical compositions, namely 60 parts by weight egg white powder+150 parts oat bran+ 180 parts water. At −1.5° C. it shows approximate yield point 25 g cm$^{-2}$, this temperature therefore is chosen for B1'. At 30° C. is shows approximate yield point 1.6 kg cm$^{-2}$, this temperature therefore is chosen for B2'.

Lubricant for the rams: egg white.

Temperature chosen for the extrusion apparatus: +1° C.

The extruded product is heated to 80° C. to make the egg white form gel.

Yield point of the solidified component A: 6.6 kg cm$^{-2}$.

Example 4

Component A': 470 parts by weight whole milk yoghurt+ 25 parts flour sugar+2.5 parts sodium salt of carboxymethylcellulose (thickening agent)+10 parts calcium lactate. The latter is admixed in order to react with pectin in the B1' and B2' components to make them solidify. The thickening agent is preblended with the sugar in order to facilitate the dissolution process.

This component acquires the approximate yield point 1.6 kg cm$^{-2}$ at −5° C., which therefore is chosen for the extrusion of this component.

Components B1' and B2': the same composition, namely: 40 parts by weight pectin (50% hydrolysed grade)+20 parts flour sugar (dryblended with the pectin)+360 parts demineralized water. At −1° C. it shows the approximate yield point 25 g cm$^{-2}$, this temperature therefore is chosen for B1'. At −1.3° C. it shows approximate yield point 1.6 kg cm$^{-2}$, this temperature therefore is chosen for B2'.

Lubricant for the rams: cream.

Temperature chosen for the extrusion apparatus: +1°.

Solidification of B1' and B2' by 2 days storage by which the calcium ions migrate into the A' component and transforms that into a gel. Yield point of the latter 1.2 kg cm$^{-2}$.

Example 5

A' component: 8 parts by weight butter+9 parts sesame oil.

At −14° C. this acquires approximate yield point 1.6 kg cm$^{-2}$, and therefore this temperature is chosen for the extrusion of A'.

Components B1' and B2': the same composition, namely 15 parts by weight oat bran+3 parts wheat gluten+18 parts water.

+1° C. the yield point is approximately 1 kg cm$^{-2}$, and this temperature is chosen for both B1' and B2'.

Temperature of extrusion apparatus: +1° C.

Lubricant for the rams: sesame oil.

Solidification of B' by storage for a short time at 100° C.

Yield point of the solid B: 1.0 kg cm$^{-2}$. The solid B is microporous.

What is claimed is:

1. A three-dimensional food product, elongated in at least the z-dimension and consisting of at least two components A and B which have been coextruded to become interspersed with each other, in which a plurality of cells of component A are surrounded at least in the xz plane by at least one component B which forms cell walls surrounding the A component, wherein said B component is a solid (including a viscoelastic solid) at 20° C., the cells of component A are arranged in at least two mutually distinct rows extending generally in the z direction, each said row of cells being separated from each adjacent row by a generally continuous in the z direction boundary cell wall of said B component, and either a) component A is a fluid having no compressional yield point at 20° C. or is a solid having plastic, pseudoplastic or viscoelastic consistency at 20° C. and a compressional yield point ($YP_{B20}$), at 20° C. which is less than 0.5× the compressional yield point of B at 20° C. ($YP_{B20}$), or b) component A is an expanded material containing at least 50% by volume gas.

2. A product according to claim 1 having two generally opposite xz faces and in which each cell of component A extends in a generally y direction substantially from a position at least adjacent to one xz face of the food product to a position at least adjacent to the other xz face.

3. A product according to claim 1 in which there are two different B components $B_1$ and $B_2$ and the boundary cell wall is formed of said first component $B_1$ and the product has bridging cells walls branching from said boundary cell wells and extending at least part way in a generally x direction towards the adjacent boundary cell wall, the bridging cell walls being form at least in part of component $B_2$.

4. A product according to claim 1 in which the components $B_1$ and $B_2$ have different yield points at 20° C.

5. A product according to claim 4 in which the yield point of component $B_1$ at 20° C. ($YP_{B1(20)}$) is in the range of 0.1 to 0.5 of the yield point of $B_2$ at 20° C. (YPBP(20).

6. A product according to claim 1 which has two generally opposite xz faces and each of the cells of component A extends part way between said two xz faces with at least two of said cells spanning the distance between the two xz faces, all of the cells being separated from one another in the y-direction, and B components are arranged between adjacent cells of component A and are separated from one another generally in the y direction to form cell walls around each component A cell, so that the A component cells are substantially enveloped by cell walls of component B.

7. A product according to claim 6 having two different B components $B_1$ and $B_2$ in which the B component between adjacent cells of the A component separated in the y-direction comprises component $B_1$.

8. A product according to claim 1 in which there are bridging cell walls branching from said boundary cell walls separating adjacent rows of A component cells and extending at least part way in a generally x direction toward an adjacent boundary cell wall and between cells of A component in said rows, and said boundary cell walls and said bridging cell walls are formed of the same B component.

9. A product according to claim 1, characterized in that any attenuation in the thickness of said bridging cell walls in the vicinity of a boundary cell wall has a local thickness generally not any thinner than $\frac{1}{15}$ of the thickest portion thereof.

10. A product according to claim 8 in which said boundary walls of B-component extend in waved or zig-zagging manner about a plane extending in the zy plane.

11. A product according to claim 1 which has bridging cell walls formed of a component B branching from said boundary cell walls and extending at least part way in a generally x direction toward an adjacent boundary cell wall and the bridging cell walls which branch off from the boundary cell walls, considered in a yz plane, branch off substantially perpendicularly to the boundary cell wall at the branching points thereof.

12. A product according to claim 2 which further comprises surface boundary walls of a component B extending substantially continuously generally at least adjacent to each xz face thereof.

13. A product according to claim 1 in which each boundary cell wall separating adjacent rows of cells of said component A is substantially planar.

14. A product according to claim 1 in which the cross section of said cells of component A in the xz plane has an average dimension in the z-direction in the range of 0.5 to 10 mm.

15. A product according to claim 1 in which the average cross-sectional area of said cells of component A in the xz plane is in the range of 0.5–100 mm$^2$.

16. A product according to claim 1 in which the average separation between adjacent rows of said cells of said component A is in the range 1–25 mm.

17. A product according to claim 16 in which the boundary cell walls of said component B separating adjacent rows of said cells of component A have a minimum thickness in the x direction in the range 5–50% of the average separation between adjacent rows.

18. A product according to claim 11 in which the bridging cell walls have a minimum thickness of 0.1 mm.

19. A product according to claim 1 wherein component A in the final form of the product at 20° C. is fluid.

20. A product according to claim 1 wherein component A in the final form of the product at 20° C. is a plastic, pseudoplastic or viscoelastic material having a compressional yield point, $YP_A$ lower than 1000 g cm$^{-2}$.

21. A product according to claim 20 wherein component A comprises a blend of solid particles selected from the group consisting of short fibres, nut- grain- or shell-pieces, film-pieces or flakes, with a water based solution or gel.

22. A product according to claim 20 wherein component A comprises a blend of solid particles selected from the group consisting of short fibres, nut-, grain-, or shell-pieces, film-pieces or flakes with an oil.

23. A product according to claim 1 wherein component B is in the form of a gel.

24. A product according to claim 1 in which component a including a component B reinforced with solid particles selected from the group consisting of short fibres, or grain-, shell- or film-pieces or flakes, has a yield point $YP_B$, of at least 200 g cm².

25. A product according to claim 1 wherein component B is comprised of fat, oil or wax with flavoring additives.

26. A product according to claim 1, wherein component B comprises protein.

27. A product according to claim 1, wherein component B is a microporous agglomerate of particles containing water in the pores, said particles being selected from the group consisting of short fibres or grain-, shell- or film-pieces or flakes and are bonded together by micro-stands of a polymer selected from the group consisting of coagulation gluten or a natural or synthetic rubber as produced by coagulation of a latex.

28. A product according claim 1 wherein component B comprises a gel of a polymer selected from the group consisting of carbohydrates or carbohydrate related compounds.

29. A product according to claim 1 wherein component B comprises a polymer and in the boundary cell walls of said polymer B extending in a generally z direction the molecules thereof are molecularly oriented generally in the z direction.

30. A product according to claim 1 wherein component A is a juice containing dissolved sugar and is in form of a flowable soft gel or thick liquid thickened with a thickening agent.

31. A product according to claim 1 wherein component A is a juice in the form of a soft gel or a thick liquid thickened with a thickening agent and contains hydrolysed proteins to in sufficient amount to impart taste and nutritional value.

32. A product according to claim 1 wherein component A contains a pulp of subdivided protein fibres or film.

33. A product according to claim 1 wherein component A is a cultured milk product.

34. A product according to claim 1 wherein component A is marzipan.

35. A product according to claim 1 wherein component A comprises a meat paste.

36. A product according to claim 1 wherein the A component contains gas dispersed therethrough.

37. A product according to claim 36 which is a bread or cake and component A comprises expanded and baked starch and B comprises protein.

38. A product according to claim 36 wherein component B comprises cheese.

39. A product according to claim 1 wherein component A has two different components, A1 and A2.

40. A product according to claim 39 in which component A1 comprises a waterbased solution or gel forming a matrix for solid particles, and A2 comprises fat or oil forming a matrix for solid particles.

41. A food product which is a three dimensional solid at 20° C. and is elongated in at least the z-dimension and consists of at least two components A and B which have different visual appearances and have been coextruded to intersperse segments of A and segments of B, wherein each B component is a solid at 20° C. and each A component is a solid at 20° C., the segments of component A are arranged in at least two mutually distinct rows extending generally in the z-direction, and the rows of segments of component A and interspersed segments of component B are visible at at least one surface of the product extending generally in a xz plane.

42. A product according to claim 41 in which the segments of component A and segments of component B are attenuated in their minimum thickness adjacent their ends as compared to their thickness at points intermediate their ends and in which the segments are dragged out during their coextrusion so as to form an acute angle of less than about 45° with the z-direction in the xz plane.

43. A product according to claim 41 in which component A and component B are selected from the group consisting of the following combinations:
   a. dark chocolate/light chocolate
   b. chocolate/marzipan
   c. chocolate/caramel
   d. two differently coloured edible gums or fruit gels.

44. A method of manufacturing by coextrusion of a plurality of extrudable edible components in an extrusion die a solid food product in which the components are extruded in a z-direction from the extrusion die and exit therefrom, and in which at least one extrudable component A' is formed into a flow through a channel and an extrudable component B' is formed in a flow through a channel, the flow of B' being in generally an x direction transverse to said z direction adjacent the flow of A', in which after exiting from said die, the flows of A' and B' are regularly divided generally in said x-direction by a dividing member to form at least two rows of flows of A' and B' separated in the x-direction, in each of which rows the flows of A' and B' are segmented in the z direction with a segment of flow of B' being joined upstream and downstream to each segment of flow of A', whereby B' segments are interposed between adjacent A' segments in the z direction and in which adjacent rows are joined to one another along their yz faces, and wherein after the joining of the segmental flows B' is transformed to a normally solid material having a compressional yield point which is at least twice that of B'.

45. A method according to claim 44 in which after the segments of flows are joined, the material A' is expanded to at least twice its original volume, or material A' is treated to reduce its yield point, if material A' is solid, or its apparent viscosity, if material A' is liquid, by at least one-half.

46. A method according to claim 44, wherein the extrusion is carried out at an elevated temperature and material B' is treated by cooling.

47. A method according to claim 44 wherein material B' is treated for form a coagulate or gel.

48. A method according to claim 47 wherein material B' is heated to form the coagulate or gel.

49. A method according to claim 47 wherein material B' normally has a continuous, firm gel structure and prior to its coextrusion is converted into extrudable form by disruption to a finely divided condition, and after the end of the coextrusion, material B' is treated to reestablish its continuous firm structure.

50. A method according to claim 47 wherein material B' is treated by chemical reaction to form the coagulate or gel.

51. A method according to claim 50 wherein a gelling reagent or coagulant is incorporated into material B' prior to the extrusion process and the rate of gelation or coagulation is retarded to delay gelation or coagulation until after the completion of said joining of said flows.

52. A method according to claim 51 in which said reagent or coagulant is incorporated into solid particles suspended in material B'.

53. A method according to claim 51 in which material B' is adapted to undergo gel formation or coagulation by enzymatic action and the gel formation or coagulation is carried out by means of an enzyme.

54. A method according to claim 47 wherein material B' is adapted to undergo gel formation or coagulation by action of a reactant and said reactant is incorporated in the material A', thereby gradually migrating into material B' when materials A' and B' are brought together in the coextrusion die.

55. A method according to claim 44 in which both material A' and material B' are each formed into at least two flows separated from one another in the x direction and in which flows of material B' are partially interposed between adjacent flows of material A'.

56. A method of coextruding at least two extrudable materials A' and B' in an extrusion die which comprises the steps of supplying at least one material A' from a reservoir therefor and advancing the same by extrusion pressure as a flow through one extrusion channel and out of an exit from the channel end, and supplying at least one material B' from a reservoir therefor and advancing the same by extrusion pressure as a narrow flow through a separate extrusion channel and out of an exit from the channel end; dividing each of the flows of materials A' and B' not prior to the respective channel exits into segments of the respective extrudates by a dividing member therefor, each said dividing member moving relative to the corresponding channel exit to traverse the entire channel exit; and controlling the flows of both materials A' and B' out of the extrusion channel exit to cause said flows to be intermittent in nature in synchronism with the movement of said dividing members.

57. The method of claim 56 wherein said flows of said materials A' and B' are controlled to cause the respective materials to flow from the corresponding channel exits when said dividing members are in said first and second positions but not when said dividing members are moving across said channel exits.

58. The method of claim 56 in which said flows of said materials A' and B' are controlled to take place intermittently by periodically applying and releasing said extrusion pressure to the respective materials in the corresponding channels.

59. The method of claim 56 in which said flows of said materials A' and B' are controlled to take place intermittently by periodically blocking and opening the channel exits to prevent said material, from exiting therefrom.

60. A method according to claim 56 including the additional step of joining together the segments of said materials A' and B' after their formation by said dividing member so that segments of material A' alternate with segments of material B'.

61. A method according to claim 57 in which the relative movement of said dividing members with respect to said channel exits creates a plurality of adjacent rows of segments of material A' and segments of material B' joined to the segments of material A' in said rows.

62. A method according to claim 44 which comprises the further step of collecting the rows of segments of materials A' and B' after they are joined, in a collection chamber in the form of a sheet.

63. A method of manufacturing by coextrusion in sheet, ribbon or filament form of a food product which is normally solid at 20° C. and is comprised of at least two components A and B in segment form, wherein segments of component B are in contact with segments of component A, which comprises extruding flows of an extrudable component A pre-cursor A' and of an extrudable component B pre-cursor B' from separate orifices of an extrusion die, subdividing each of said flows into segments and combining said subdivided flows in rows with the segments of pre-cursor B' generally alternating with segments of pre-cursor A' and, after extrusion, converting said pre-cursor B' to a solid material B, in which extrudable pre-cursor B' is adapted to be rendered normally solid by coagulation or gel formation and a coagulant or gelling reagent is incorporated in pre-cursor A' whereby when said segments of pre-cursor B' are in contact with segments of pre-cursor A', said pre-cursor B' is gelled or coagulated by said reagent.

64. A method according to claim 63 an which said pre-cursor B' is adapted to undergo gelling or coagulation by the action of an enzyme and an enzyme is incorporated in said pre-cursor A'.

65. A method according to claim 64 in which pre-cursor B' comprises a protein and said enzyme is a protease.

66. An apparatus suitable for carrying out a process according to claim 44, comprising an extrusion die having channels for flow therethrough of at least two different relatively soft extrudable materials, said channels ending in orifices for exit in generally one direction of said materials from the channels, said channels being separated from one another in a direction generally transverse to said one direction, dividing members capable of moving in said generally transverse direction across the orifices to divide the flows into segments arranged in at least two adjacent rows extending generally in said one direction, and means for combining said rows of segments into a unitary product, and comprising further means for subjecting said product to conditions to convert at least one of the materials in the product from its relatively soft extrudable state to a relatively hard solid state.

67. Apparatus suitable for carrying out the process of claim 56, comprising an extrusion die having channels terminating in exit orifices through which at least two different extrudable materials may flow, said orifices being arranged generally in a row and separated from one another generally in the direction of said row, means for causing the materials to pass through the channels and out of said orifices, dividing members which are capable of intermittent movement relative to said orifices in generally said same direction across the orifices to divide the flows of materials therethrough, and means for controlling the movement of the dividing members and said means for causing the materials to pass through the channels and out of said orifices so that relative movement of the dividing members with respect to said orifices takes place intermittently and said materials are passed out of said orifices while relative movement between the dividing members and the orifices is stopped.

68. Apparatus as in claim 67 wherein said means for causing said material to pass through said channels and out of the orifices thereof comprises a pressure member for each channel operable intermittently to exert and release extrusion pressure upon the material in such channel.

69. Apparatus as in claim 67 wherein said channels have entrance openings for introduction of the respective materials therein and further comprising reservoirs for the respective materials in communication with said entrance openings to deliver the materials therefrom to said openings and non-return valves between said entrance openings and said reservoirs to prevent return flow of materials to said reservoirs when said pressure members exert extrusion pressure upon the materials in said channels while allowing flow from the reservoirs to said openings when said extrusion pressure is released.

70. Apparatus as in claim 67 wherein said means for controlling the driving of said materials through said channels and out of the orifices comprises valve means associated with each channel orifice and operable to alternatively block and open said orifices for passage of said materials therethrough.

\* \* \* \* \*

UNITED STATES PATENT AND TRADEMARK OFFICE
CERTIFICATE OF CORRECTION

PATENT NO. : 6,887,503 B1
DATED : May 3, 2005
INVENTOR(S) : Ole-Bendt Rasmussen

It is certified that error appears in the above-identified patent and that said Letters Patent is hereby corrected as shown below:

Title page,
Item [57], ABSTRACT,
Line 8, "tow" should read -- two --.
Line 11, "of" should read -- or --.
Line 13, "is" should read -- are --.

Column 1,
Line 27, after "product" insert -- , --.
Line 43, "description will" should read -- description—will --.

Column 2,
Line 7, after "However" insert -- , --.
Lines 13 and 14, "cm" should read -- $cm^{-2}$ --.
Line 28, "is" should read -- are --.

Column 3,
Line 50, after "mm" insert -- , --.
Line 51, after "instance" insert -- , --.

Column 4,
Line 14, after "branching-off" delete ",".
Lines 15-16, "branch.
                More" should read -- branch, more --.
Line 31, after "also" insert -- , --.
Line 32, after "later" insert -- , --.
Line 34, "wall" should read -- walls --.
Line 37, "Very" should read -- A very --.
Line 39, "and illustrated" should read -- are illustrated --.
Line 67, after "A" delete ",".

Column 5,
Line 47, "as" should read -- is --.
Line 57, "relatives" should read -- relative --.

Column 6,
Line 13, "carryingout" should read -- carrying out --.
Line 14, after "invention" delete ",".
Line 20, "component" should read -- components --.
Line 39, "a" should read -- an --.
Line 43, "3,511,743" should read -- 3,511,742 --.
Line 51, "dieparts" should read -- die parts --.

UNITED STATES PATENT AND TRADEMARK OFFICE
CERTIFICATE OF CORRECTION

PATENT NO. : 6,887,503 B1
DATED : May 3, 2005
INVENTOR(S) : Ole-Bendt Rasmussen

It is certified that error appears in the above-identified patent and that said Letters Patent is hereby corrected as shown below:

Column 7,
Line 33, "gelformed," should read -- gel formed, --.
Line 34, "other" should read -- another --.
Line 64, "6a" should read -- 7a --.

Column 8,
Line 21, "4553" should read -- 45-53 --.
Line 32, "is" should read -- are --.
Line 38, "7a," should read -- 6a and 10, --.

Column 9,
Line 33, after "A'-components" insert -- , --.
Line 33, after "instance" insert -- , --.
Line 58, "soyaprotein" should read -- soya protein --.
Line 62, "is" should read -- are --.

Column 10,
Lines 19-28, should be all one paragraph.
Line 43, "icecrystals" should read -- ice crystals --.
Line 45, "watersoluble" should read -- water soluble --.
Line 47, "shortdigestible" should read -- short digestible --.

Column 11,
Line 6, "semifirm" should read -- semi-firm --.
Line 14, "semimolten" should read -- semi-molten --.
Line 17, "Icecream, e.g. chocolate icecream," should read -- Ice cream, e.g. chocolate ice cream --.
Line 30, "soyaprotein" should read -- soya protein --.
Line 52, "cake like" should read -- cake-like --.

Column 15,
Line 8, "are" should read -- is --.
Line 13, after "$b$" insert -- , --.
Line 17, "(although preferable)." should read -- (although preferable)). --.

Column 16,
Line 11, "viscosity," should read -- viscosity --.
Line 48, "wails" should read -- walls --.

Column 17,
Line 20, "flow which" should read -- flow-which --.

UNITED STATES PATENT AND TRADEMARK OFFICE
CERTIFICATE OF CORRECTION

PATENT NO. : 6,887,503 B1
DATED : May 3, 2005
INVENTOR(S) : Ole-Bendt Rasmussen

It is certified that error appears in the above-identified patent and that said Letters Patent is hereby corrected as shown below:

Column 18,
Line 2, "now" should read -- not --.
Line 12, "are" should read -- is --.

Column 19,
Line 3, "drive" should read -- drives --.
Line 56, after "amounts," delete "used".

Column 20,
Line 2, after "may" insert -- be --.
Line 21, "A component" should read -- A'-component --.
Line 27, "A-component" should read -- A-component --.
Line 47, "is" should read -- are --.

Column 21,
Line 7, after "(59)" delete "of".
Line 32, "other" should read -- another --.

Column 22,
Line 11, after "instead" delete "is".
Line 14, "programme" should read -- program --.
Line 30, "plein" should read -- plain --.
Line 43, "lefti" should read -- left --.
Line 58, "are in their" should read -- is in its --.

Column 23,
Lines 36 and 46, "programme" should read -- program --.
Line 47, "programmes" should read -- programs --.

Column 24,
Line 2, "prior—to" should read -- —prior to --.
Line 22, "drice" should read -- device --.
Line 28, "coextrusion" should read -- co extrusion --.
Line 28, "foodstructures" should read -- food structures --.
Line 30, "dieparts" should read -- die parts --.
Line 50, after "out" insert -- of --.

Column 25,
Line 6, "plane" should read -- plain --.
Line 8, " "mould" " should read -- "mold" --.
Line 19, "measure" should read -- measures --.

UNITED STATES PATENT AND TRADEMARK OFFICE
CERTIFICATE OF CORRECTION

PATENT NO. : 6,887,503 B1
DATED : May 3, 2005
INVENTOR(S) : Ole-Bendt Rasmussen

It is certified that error appears in the above-identified patent and that said Letters Patent is hereby corrected as shown below:

Column 26,
Line 41, "is" should read -- it --.
Line 51, "yoghurt" should read -- yogurt --.

Column 27,
Line 56, "form" should read -- formed --.
Line 60, "($YP_{B1(20)}$))" should read -- $YP_{Bl(20)}$)) --.
Line 61, "(YPBP20)" should read -- (YPBP20)) --.

Column 28,
Line 65, "water based" should read -- waterbased --.

Column 29,
Line 6, "a" should read -- B --.
Line 17, "micro-stands" should read -- micro-strands --.
Line 20, after "according" insert -- to --.
Line 28, after "in" insert -- the --.
Line 33, after "protein" delete "to".

Column 31,
Line 35, "material" should read -- materials --.

Signed and Sealed this

Seventh Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,887,503 B1  
APPLICATION NO. : 09/926310  
DATED : May 3, 2005  
INVENTOR(S) : Ole-Bendt Rasmussen It is certified that error appears in the above-identified patent and that said Letters Patent is hereby corrected as shown below:

On the TITLE PG, COL 2 Item (57) under Abstract, on line 8, "tow" should read --two--.

On the TITLE PG, COL 2 Item (57) under Abstract, on line 11, "of" should read --or--.

On the TITLE PG, COL 2 Item (57) under Abstract, on line 13, "is" should read --are--.

Column 1, line 27, after "product" insert --,--.

Column 1, line 43, "description will" should read --description—will--.

Column 2, line 7, after "However" insert --,--.

Column 2, line 13, "cm" should read --cm$^{-2}$--.

Column 2, line 14, "cm" should read -- cm$^{-2}$--.

Column 2, line 28, "is" should read -- are--.

Column 3, line 50 after "mm" insert --,--.

Column 3, line 51, after "instance" insert --,--.

Column 4, line 14, after "branching-off" delete ",".

Column 4, line 15-16, "branch. More" should read --branch, more--

UNITED STATES PATENT AND TRADEMARK OFFICE
CERTIFICATE OF CORRECTION

PATENT NO. : 6,887,503 B1
APPLICATION NO. : 09/926310
DATED : May 3, 2005
INVENTOR(S) : Ole-Bendt Rasmussen It is certified that error appears in the above-identified patent and that said Letters Patent is hereby corrected as shown below:

Column 4, line 31, after "also" insert --,--.

Column 4, line 32, after "later" insert --,--.

Signed and Sealed this

Fourteenth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 6,887,503 B1
APPLICATION NO. : 09/926310
DATED : May 3, 2005
INVENTOR(S) : Ole-Bendt Rasmussen It is certified that error appears in the above-identified patent and that said Letters Patent is hereby corrected as shown below:

<u>Title page,</u>
Item [57], ABSTRACT,
Line 8, "tow" should read -- two --.
Line 11, "of" should read -- or --.
Line 13, "is" should read -- are --.

<u>Column 1,</u>
Line 27, after "product" insert -- , --.
Line 43, "description will" should read -- description—will --.

<u>Column 2,</u>
Line 7, after "However" insert -- , --.
Lines 13 and 14, "cm" should read -- $cm^{-2}$ --.
Line 28, "is" should read -- are --.

<u>Column 3,</u>
Line 50, after "mm" insert -- , --.
Line 51, after "instance" insert -- , --.

<u>Column 4,</u>
Line 14, after "branching-off" delete ",".
Lines 15-16, "branch. More" should read -- branch, more --.
Line 31, after "also" insert -- , --.
Line 32, after "later" insert -- , --.
Line 34, "wall" should read -- walls --.
Line 37, "Very" should read -- A very --.
Line 39, "and illustrated" should read -- are illustrated --.
Line 67, after "A" delete ",".

<u>Column 5,</u>
Line 47, "as" should read -- is --.
Line 57, "relatives" should read -- relative --.

<u>Column 6,</u>
Line 13, "carryingout" should read -- carrying out --.
Line 14, after "invention" delete ",".
Line 20, "component" should read -- components --.
Line 39, "a" should read -- an --.
Line 43, "3,511,743" should read -- 3,511,742 --.
Line 51, "dieparts" should read -- die parts --.

UNITED STATES PATENT AND TRADEMARK OFFICE
CERTIFICATE OF CORRECTION

PATENT NO. : 6,887,503 B1
APPLICATION NO. : 09/926310
DATED : May 3, 2005
INVENTOR(S) : Ole-Bendt Rasmussen It is certified that error appears in the above-identified patent and that said Letters Patent is hereby corrected as shown below:

Column 7,
Line 33, "gelformed," should read -- gel formed, --.
Line 34, "other" should read -- another --.
Line 64, "6$a$" should read -- 7$a$ --.

Column 8,
Line 21, "4553" should read -- 45-53 --.
Line 32, "is" should read -- are --.
Line 38, "7$a$," should read -- 6$a$ and 10, --.

Column 9,
Line 33, after "A'-components" insert -- , --.
Line 33, after "instance" insert -- , --.
Line 58, "soyaprotein" should read -- soya protein --.
Line 62, "is" should read -- are --.

Column 10,
Lines 19-28, should be all one paragraph.
Line 43, "icecrystals" should read -- ice crystals --.
Line 45, "watersoluble" should read -- water soluble --.
Line 47, "shortdigestible" should read -- short digestible --.

Column 11,
Line 6, "semifirm" should read -- semi-firm --.
Line 14, "semimolten" should read -- semi-molten --.
Line 17, "Icecream, e.g. chocolate icecream," should read -- Ice cream, e.g. chocolate ice cream --.
Line 30, "soyaprotein" should read -- soya protein --.
Line 52, "cake like" should read -- cake-like --.

Column 15,
Line 8, "are" should read -- is --.
Line 13, after "$b$" insert -- , --.
Line 17, "(although preferable)." should read -- (although preferable)). --.

Column 16,
Line 11, "viscosity," should read -- viscosity --.
Line 48, "wails" should read -- walls --.

Column 17,
Line 20, "flow which" should read -- flow-which --.
Line 61 through Column 18, line 29 should be all one paragraph.

UNITED STATES PATENT AND TRADEMARK OFFICE
CERTIFICATE OF CORRECTION

PATENT NO. : 6,887,503 B1
APPLICATION NO. : 09/926310
DATED : May 3, 2005
INVENTOR(S) : Ole-Bendt Rasmussen It is certified that error appears in the above-identified patent and that said Letters Patent is hereby corrected as shown below:

Column 18,
Line 2, "now" should read -- not --.
Line 12, "are" should read -- is --.

Column 19,
Line 3, "drive" should read -- drives --.
Line 56, after "amounts," delete "used".

Column 20,
Line 2, after "may" insert -- be --.
Line 21, "A component" should read -- A'-component --.
Line 27, "A-component" should read -- A-component --.
Line 47, "is" should read -- are --.

Column 21,
Line 7, after "(59)" delete "of".
Line 32, "other" should read -- another --.

Column 22,
Line 11, after "instead" delete "is".
Line 14, "programme" should read -- program --.
Line 30, "plein" should read -- plain --.
Line 43, "lefti" should read -- left --.
Line 58, "are in their" should read -- is in its --.

Column 23,
Lines 36 and 46, "programme" should read -- program --.
Line 47, "programmes" should read -- programs --.

Column 24,
Line 2, "prior—to" should read -- —prior to --.
Line 22, "drice" should read -- device --.
Line 28, "coextrusion" should read -- co extrusion --.
Line 28, "foodstructures" should read -- food structures --.
Line 30, "dieparts" should read -- die parts --.
Line 50, after "out" insert -- of --.

Column 25,
Line 6, "plane" should read -- plain --.
Line 8, " "mould" " should read -- "mold" --.
Line 19, "measure" should read -- measures --.

UNITED STATES PATENT AND TRADEMARK OFFICE
CERTIFICATE OF CORRECTION

PATENT NO. : 6,887,503 B1
APPLICATION NO. : 09/926310
DATED : May 3, 2005
INVENTOR(S) : Ole-Bendt Rasmussen It is certified that error appears in the above-identified patent and that said Letters Patent is hereby corrected as shown below:

Column 26,
Line 41, "is" should read -- it --.
Line 51, "yoghurt" should read -- yogurt --.

Column 27,
Line 56, "form" should read -- formed --.
Line 60, "($YP_{B1(20)}$))" should read -- ($YP_{BI(20)}$) --.
Line 61, "(YPBP20)" should read -- (YPBP20)) --.

Column 28,
Line 65, "water based" should read -- waterbased --.

Column 29,
Line 6, "a" should read -- B --.
Line 17, "micro-stands" should read -- micro-strands --.
Line 20, after "according" insert -- to --.
Line 28, after "in" insert -- the --.
Line 33, after "protein" delete "to".

Column 31,
Line 35, "material" should read -- materials --.

This certificate supersedes Certificate of Correction issued February 7, 2006 and November 14, 2006.

Signed and Sealed this

Twentieth Day of February, 2007

JON W. DUDAS
*Director of the United States Patent and Trademark Office*